(12) United States Patent
Abotabl et al.

(10) Patent No.: US 12,382,399 B2
(45) Date of Patent: Aug. 5, 2025

(54) RADIO LINK MONITORING AND BEAM FAILURE DETECTION FOR ENERGY SAVING MODES

(71) Applicant: QUALCOMM Incorporated, San Diego, CA (US)

(72) Inventors: Ahmed Attia Abotabl, San Diego, CA (US); Ahmed Elshafie, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 17/724,153

(22) Filed: Apr. 19, 2022

(65) Prior Publication Data

US 2023/0337137 A1 Oct. 19, 2023

(51) Int. Cl.
*H04W 52/02* (2009.01)
*H04W 72/542* (2023.01)

(52) U.S. Cl.
CPC ... *H04W 52/0238* (2013.01); *H04W 52/0216* (2013.01); *H04W 72/542* (2023.01)

(58) Field of Classification Search
CPC ......... H04W 52/0238; H04W 52/0216; H04W 72/542; H04W 52/0206; Y02D 30/70
See application file for complete search history.

(56) References Cited

FOREIGN PATENT DOCUMENTS

EP 3627910 A1 * 3/2020 ........... G06F 1/3209
WO WO-2021067444 A2 4/2021

OTHER PUBLICATIONS

International Search Report and Written Opinion—PCT/US2023/063864—ISA/EPO—Jun. 16, 2023.

* cited by examiner

*Primary Examiner* — Ayanah S George
(74) *Attorney, Agent, or Firm* — Holland & Hart LLP

(57) ABSTRACT

Methods, systems, and devices for wireless communications are described. A user equipment (UE) may receive a first message indicating that a network entity, in wireless communication with the UE, is operating in a first energy saving mode of multiple energy saving modes. The UE may receive information indicating multiple sets of parameters for a radio link monitoring (RLM) operation, each of the sets of parameters being associated with a different energy saving mode. The UE may perform the RLM operation using one or more parameters of a first set of parameters (e.g., a maximum beam failure instance count parameter, one or more threshold parameters, and other parameters) associated with the first energy saving mode. The may use a second set of parameters to perform the RLM operation in response to the network entity switching from operating in the first energy saving mode to operating in the second energy saving mode.

28 Claims, 11 Drawing Sheets

RADIO LINK MONITORING AND BEAM FAILURE DETECTION FOR ENERGY SAVING MODES

FIELD OF TECHNOLOGY

The following relates to wireless communications, including radio link monitoring (RLM) and beam failure detection for energy saving modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support communications between a network entity and a UE. The UE may perform a radio link monitoring (RLM) operation and beam failure detection. In some cases, however, the efficiency and accuracy of the RLM operation may decrease if the network entity operates in multiple energy saving modes.

SUMMARY

The described techniques relate to improved methods, systems, devices, and apparatuses that support radio link monitoring (RLM) and beam failure detection for energy saving modes. For example, the described techniques provide for a user equipment (UE) to use different parameters for regulating RLM and beam failure detection when a network entity is operating using different energy saving modes. For example, a UE may perform an RLM operation using particular parameters based on which energy saving mode the network entity is operating in, where the parameters may change based on the energy saving mode changing. In some cases, the UE may receive a first message indicating that the network entity is operating in a first energy saving mode, which may be one of multiple energy saving modes. The UE may receive an indication of multiple sets of parameters for an RLM operation, where each set of parameters is associated with a different energy saving mode. The parameters may include a timer parameter, a maximum count parameter, and threshold parameters, among other examples. In some cases, the UE may perform the RLM operation using one or more parameters of a first set of parameters associated with the first energy saving mode. In some examples, the UE may engage in the RLM operation and beam failure detection when the network entity changes from operating in the first energy saving mode to operating in another energy saving mode, thus changing the effective set of parameters for the RLM operation at the UE. For example, the UE may receive a second message indicating that the network entity is to switch from operating in the first energy saving mode to operating in a second energy saving mode, which may be associated with a second set of parameters. In response to the network entity switching energy saving modes, the UE may update a beam failure instance counter, update and adjust a beam failure detection timer, apply updated threshold parameters, or perform another RLM operation.

A method for wireless communication at a UE is described. The method may include receiving a first message indicating that a network entity in wireless communication with the UE is operating in a first energy saving mode, where the first energy saving mode is one of a set of multiple energy saving modes, receiving information indicative of a set of multiple sets of parameters for a RLM operation pertaining to wireless communication between the UE and the network entity, each of the set of multiple sets of parameters being associated with a different energy saving mode of the set of multiple energy saving modes, and performing the RLM operation using one or more parameters of a first set of parameters associated with the first energy saving mode.

An apparatus for wireless communication at a UE is described. The apparatus may include a processor, memory coupled with the processor, and instructions stored in the memory. The instructions may be executable by the processor to cause the apparatus to receive a first message indicating that a network entity in wireless communication with the UE is operating in a first energy saving mode, where the first energy saving mode is one of a set of multiple energy saving modes, receive information indicative of a set of multiple sets of parameters for a RLM operation pertaining to wireless communication between the UE and the network entity, each of the set of multiple sets of parameters being associated with a different energy saving mode of the set of multiple energy saving modes, and perform the RLM operation using one or more parameters of a first set of parameters associated with the first energy saving mode.

Another apparatus for wireless communication at a UE is described. The apparatus may include means for receiving a first message indicating that a network entity in wireless communication with the UE is operating in a first energy saving mode, where the first energy saving mode is one of a set of multiple energy saving modes, means for receiving information indicative of a set of multiple sets of parameters for a RLM operation pertaining to wireless communication between the UE and the network entity, each of the set of multiple sets of parameters being associated with a different energy saving mode of the set of multiple energy saving modes, and means for performing the RLM operation using one or more parameters of a first set of parameters associated with the first energy saving mode.

A non-transitory computer-readable medium storing code for wireless communication at a UE is described. The code may include instructions executable by a processor to receive a first message indicating that a network entity in wireless communication with the UE is operating in a first energy saving mode, where the first energy saving mode is one of a set of multiple energy saving modes, receive information indicative of a set of multiple sets of parameters for a RLM operation pertaining to wireless communication between the UE and the network entity, each of the set of multiple sets of parameters being associated with a different energy saving mode of the set of multiple energy saving modes, and perform the RLM operation using one or more parameters of a first set of parameters associated with the first energy saving mode.

In some examples of the method, apparatuses, and non-transitory computer-readable medium described herein, receiving the information indicative of the set of multiple sets of parameters may include operations, features, means, or instructions for receiving, with each of the set of multiple sets of parameters, an indication of a maximum beam failure instance count, each of the maximum beam failure instance counts being specific to a respective energy saving mode of the set of multiple energy saving modes, the maximum beam failure instance count representing a value with which the UE compares a beam failure instance counter value as part of the RLM operation.

Some examples of the method, apparatuses, and non-transitory computer-readable medium described herein may further include operations, features, means, or instructions for receiving a second message indicating that the network entity may be to switch from the first energy saving mode to a second energy saving mode associated with operation of the network entity, where the second energy saving mode may be one of the set of multiple energy saving modes and setting a maximum beam failure instance count value for the RLM operation based on a second set of parameters associated with the second energy saving mode, the second set of parameters being of the set of multiple sets of parameters.

Some examples of the method, apparatuses, and non-transitory computer-readable medium described herein may further include operations, features, means, or instructions for initiating a beam failure instance counter at the UE as part of the RLM operation and while the network entity may be operating in the first energy saving mode, incrementing the beam failure instance counter as part of the RLM operation, and re-initiating the beam failure instance counter based on the network entity switching to operation in the second energy saving mode.

Some examples of the method, apparatuses, and non-transitory computer-readable medium described herein may further include operations, features, means, or instructions for initiating a beam failure instance counter at the UE as part of the RLM operation and while the network entity may be operating in the first energy saving mode, incrementing the beam failure instance counter as part of the RLM operation, and modifying a count of the beam failure instance counter by a value based on the network entity switching from operation in the first energy saving mode to operation in the second energy saving mode.

Some examples of the method, apparatuses, and non-transitory computer-readable medium described herein may further include operations, features, means, or instructions for initiating a beam failure instance counter at the UE as part of the RLM operation and while the network entity may be operating in the first energy saving mode, incrementing the beam failure instance counter as part of the RLM operation, and determining whether to declare beam failure based on a comparison of a value of the beam failure instance counter with the maximum beam failure instance count value associated with the second energy saving mode, the comparison occurring at or after the network entity switching from operation in the first energy saving mode to operation in the second energy saving mode.

Some examples of the method, apparatuses, and non-transitory computer-readable medium described herein may further include operations, features, means, or instructions for initiating a first beam failure detection timer at the UE as part of the RLM operation and while the network entity may be operating in the first energy saving mode, the first beam failure detection timer having a first maximum value pertaining to a timing for determining beam failure, the first maximum value of the first beam failure detection timer identified in the first set of parameters, running the first beam failure detection timer as part of the RLM operation, where at a time of the network entity switching from operation in the first energy saving mode to operation in the second energy saving mode, the first beam failure detection timer may be still running, and determining whether to adjust the timing for determining beam failure based on the network entity switching from operation in the first energy saving mode to operation in the second energy saving mode.

In some examples of the method, apparatuses, and non-transitory computer-readable medium described herein, determining whether to adjust the timing may include operations, features, means, or instructions for resetting the timing by initiating a second beam failure detection timer at the UE as part of the RLM operation and based on the network entity switching from operation in the first energy saving mode to operation in the second energy saving mode, the second beam failure detection timer having a second maximum value pertaining to the timing for determining beam failure, the second maximum value of the second beam failure detection timer identified in the second set of parameters.

In some examples of the method, apparatuses, and non-transitory computer-readable medium described herein, determining whether to adjust the timing may include operations, features, means, or instructions for initiating a second beam failure detection timer at the UE as if the second beam failure detection timer was started at a same time as the first beam failure detection timer, the second beam failure detection timer having a second maximum value pertaining to the timing for determining beam failure, the second maximum value of the second beam failure detection timer identified in the second set of parameters.

In some examples of the method, apparatuses, and non-transitory computer-readable medium described herein, determining whether to adjust the timing may include operations, features, means, or instructions for maintaining the timing by allowing the first beam failure detection timer to continue until the first beam failure detection timer either resets or expires.

In some examples of the method, apparatuses, and non-transitory computer-readable medium described herein, determining whether to adjust the timing may include operations, features, means, or instructions for applying an offset to the first maximum value of the first beam failure detection timer so that the timing may be equal to a second maximum value identified in the second set of parameters associated with the second energy saving mode of the network entity.

In some examples of the method, apparatuses, and non-transitory computer-readable medium described herein, receiving the information indicative of the set of multiple sets of parameters may include operations, features, means, or instructions for receiving, with each of the set of multiple sets of parameters, an indication of an in-sync threshold and an out-of-sync threshold, each of the in-sync thresholds and the out-of-sync thresholds being specific to a respective energy saving mode of the set of multiple energy saving modes, the in-sync thresholds and the out-of-sync thresholds being used to evaluate a downlink reliability of a channel for wireless communications between the UE and the network entity.

Some examples of the method, apparatuses, and non-transitory computer-readable medium described herein may further include operations, features, means, or instructions for receiving a second message indicating that the network entity may be to switch from the first energy saving mode to a second energy saving mode associated with operation of the network entity, where the second energy saving mode may be one of the set of multiple energy saving modes and setting an in-sync threshold and an out-of-sync threshold for determining channel reliability of the wireless communication between the UE and the network entity based on a second set of parameters associated with the second energy saving mode, the second set of parameters being of the set of multiple sets of parameters.

Some examples of the method, apparatuses, and non-transitory computer-readable medium described herein may further include operations, features, means, or instructions for re-evaluating previous in-sync or out-of-sync determinations based on the in-sync threshold or the out-of-sync threshold from the second set of parameters.

In some examples of the method, apparatuses, and non-transitory computer-readable medium described herein, setting the in-sync threshold and the out-of-sync threshold may include operations, features, means, or instructions for applying an offset to a previous in-sync threshold and a previous out-of-sync threshold associated with the first energy saving mode.

DETAILED DESCRIPTION

Figure 1:
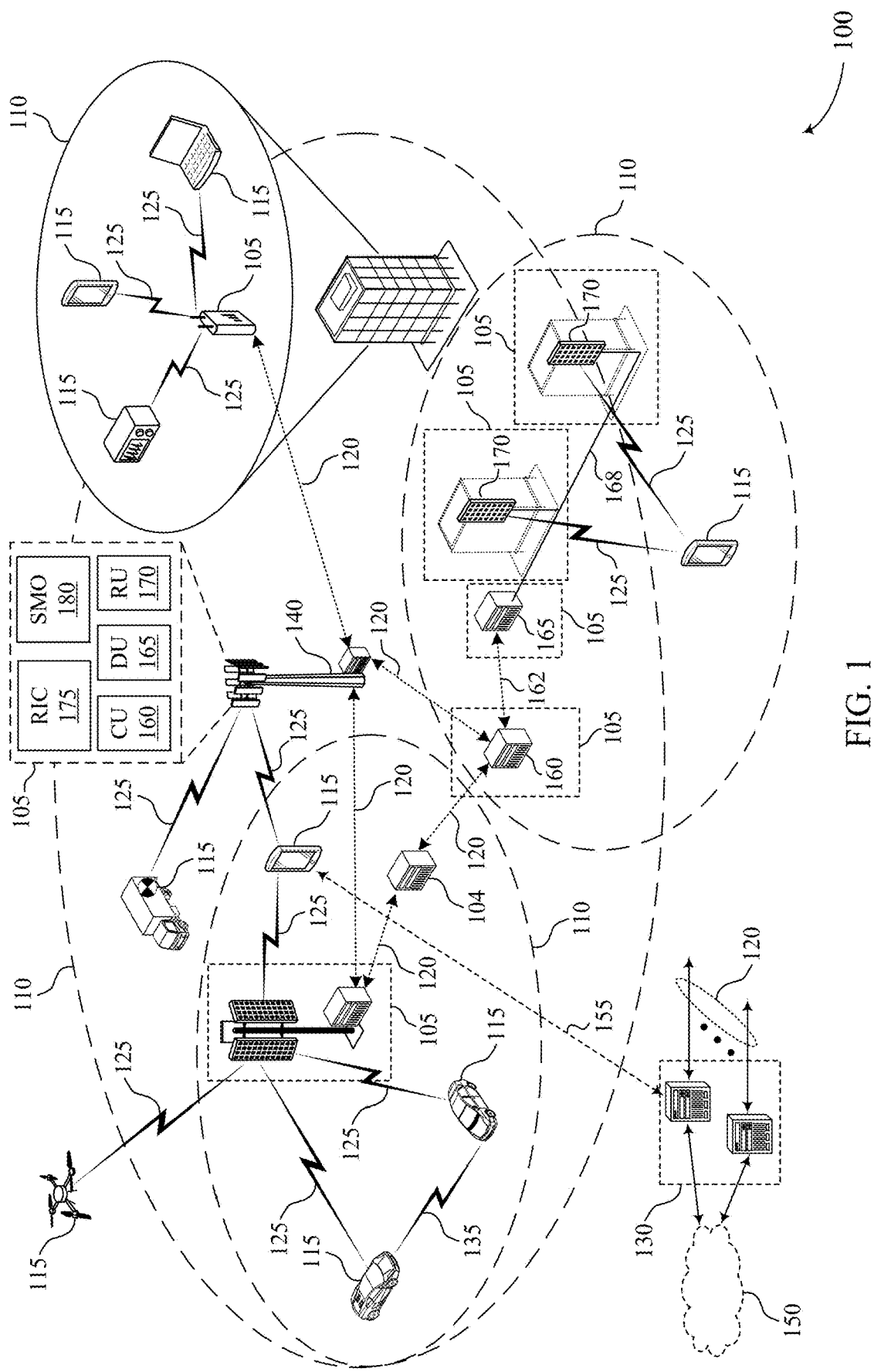
FIG. 1 illustrates an example of a wireless communications system that supports radio link monitoring (RLM) and beam failure detection for energy saving modes in accordance with one or more aspects of the present disclosure.

A network entity (e.g., a base station) may use different energy or power saving modes to save power while maintaining network operations. For example, the network entity may operate in different energy saving modes according to current traffic conditions of user equipments (UEs) communicating with the network entity. These energy saving modes may reduce a transmission power or reduce a number of activated antennas at the network entity, for example, which may result in power savings. Concurrently, a UE may perform a radio link monitoring (RLM) operation to monitor a quality of a communications link between the UE and the network entity to ensure reliable communications. In some examples, different energy saving modes of the network entity may impact the RLM, resulting in a higher probability of beam failure as the UE may fail to monitor for, detect, and remedy failed beams. In addition, a UE may lack methods for operating RLM when the network entity switches from one energy saving mode to another, which may reduce the effectiveness of RLM.

Techniques described herein enable a UE to use different parameters for regulating RLM and beam failure detection when a network entity is operating using different energy saving modes. For example, a UE may perform an RLM operation using particular parameters based on which energy saving mode the network entity is operating in, where the parameters may change based on the energy saving mode changing. In some cases, the UE may receive a first message indicating that the network entity is operating in a first energy saving mode, which may be one of multiple energy saving modes. The UE may receive an indication of multiple sets of parameters for an RLM operation, where each set of parameters is associated with a different energy saving mode. The parameters may include a timer parameter, a maximum count parameter, and threshold parameters, among other examples. In some cases, the UE may perform the RLM operation using one or more parameters of a first set of parameters associated with the first energy saving mode.

In some examples, the UE may engage in the RLM operation and beam failure detection when the network entity changes from operating in the first energy saving mode to operating in another energy saving mode, thus changing the effective set of parameters for the RLM operation at the UE. For example, the UE may receive a second message indicating that the network entity is to switch from operating in the first energy saving mode to operating in a second energy saving mode, which may be associated with a second set of parameters. In response to the network entity switching energy saving modes, the UE may update a beam failure instance counter, update and adjust a beam failure detection timer, apply updated threshold parameters, or perform another RLM operation. As such, the efficiency and accuracy of RLM operations and beam failure detection may increase, which may reduce the amount of failed beams and increase reliability of communications between the UE and the network entity, among other benefits.

Aspects of the disclosure are initially described in the context of wireless communications systems. Aspects of the disclosure are then described in the context of timers and process flows. Aspects of the disclosure are further illustrated by and described with reference to apparatus diagrams, system diagrams, and flowcharts that relate to RLM and beam failure detection for energy saving modes.

FIG. 1 illustrates an example of a wireless communications system 100 that supports RLM and beam failure detection for energy saving modes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE- Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support RLM and beam failure detection for energy saving modes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

A network entity 105 (e.g., a base station 140) may use different energy saving modes and operations to save power while maintaining network operations. In some cases, the network entity 105 may switch an energy saving mode it is operating in according to an input from the network entity 105 and current traffic conditions corresponding to UEs 115 in wireless communications with the network entity 105. For example, in low traffic conditions (e.g., if the network entity 105 has few transmissions with a relatively small quantity of UEs 115), then the network entity 105 may limit its capabilities, for example by refraining from activating all antennas or by transmitting with a lower power. In some examples, different energy saving modes may trigger the network entity 105 to adapt a bandwidth and a number of active antennas, in addition to other methods of power saving.

In some cases, concurrently to a network entity 105 operating in a particular energy saving mode, a UE 115 may perform RLM to monitor the quality of a communication link 125 (e.g., a downlink) and to ensure reliable communications with the network entity 105. In some examples, the UE 115 may monitor link quality at a physical (PHY) layer of the UE 115 and report any beam failure instances to a higher layer (e.g., a MAC layer). If the UE 115 detects that the quality of the communication link 125 is below a particular threshold, the UE 115 may declare radio link failure (e.g., detect a failed beam) and begin recovery procedures to continue communicating with the network entity 105. In some examples, the UE may detect a beam failure based on one or more downlink signals (e.g., a synchronization signal block (SSB), a CSI-RS).

The UE 115 may declare a beam failure if a number of out-of-sync signals reported to the MAC layer from a lower layer (e.g., the PHY layer) exceeds a maximum configured limit within a given time. For example, upon the MAC layer receiving an indication of a beam failure instance from a lower layer, the UE 115 may start a first timer (e.g., beamFailureDetectionTimer). In addition, the UE 115 may increment a counter (e.g., BFI_COUNTER), which may count a number of beam failure instances reported to the higher layer. As such, the UE 115 may track a number of beam failure instances without starting a new timer upon each indication of a new beam failure instance. In some examples, the UE 115 may compare the counter to a maximum configured limit (e.g., beamFailureInstanceMaxCount), such that the UE 115 may count how many beam failure instances occur in a given time period (e.g., beamFailureDetectionTime). If the count on the counter exceeds the maximum configured limit, then the UE 115 may initiate a random access procedure to recover from the beam failure. If the timer expires before the count reaches the maximum configured limit, then the counter may be reset to zero and the UE 115 may refrain from declaring a beam failure (e.g., where a next reported beam failure instance may restart the timer).

The wireless communications system 100 may support a UE 115 using different parameters for regulating RLM and beam failure detection when a network entity 105 is operating using different energy saving modes. For example, a UE 115 may perform an RLM operation using particular parameters based on which energy saving mode the network entity 105 is operating in, where the parameters may change based on the energy saving mode changing. In some cases, the UE 115 may receive a first message indicating that the network entity 105 is operating in a first energy saving mode, which may be one of multiple energy saving modes. The UE 115 may receive an indication of multiple sets of parameters for an RLM operation, where each set of parameters is associated with a different energy saving mode. The parameters may include a timer parameter, a maximum count parameter, and threshold parameters, among other examples. In some cases, the UE 115 may perform the RLM operation using one or more parameters of a first set of parameters associated with the first energy saving mode.

Figure 2:
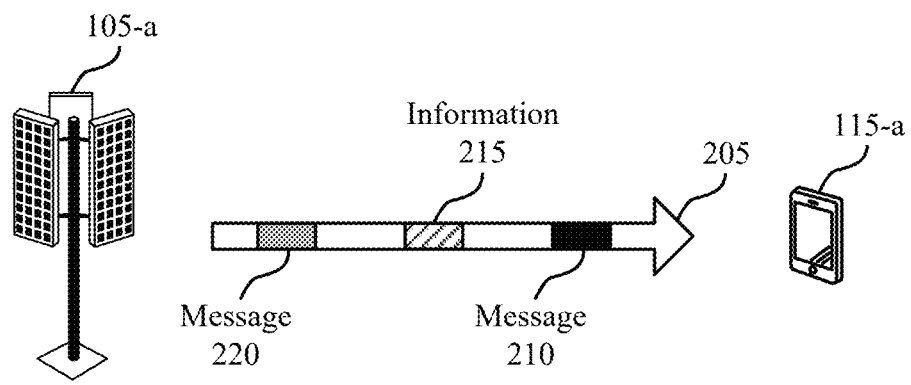
FIG. 2 illustrates an example of a wireless communications system that supports RLM and beam failure detection for energy saving modes in accordance with one or more aspects of the present disclosure.

FIG. 2 illustrates an example of a wireless communications system 200 that supports RLM and beam failure detection for energy saving modes in accordance with one or more aspects of the present disclosure. In some examples, the wireless communications system 200 may implement aspects of the wireless communications system 100 or may be implemented by aspects of the wireless communications system 100. For example, the wireless communications system 200 may include a network entity 105-a and a UE 115-a, which may be examples of corresponding devices described herein. The wireless communications system 200 may support different parameters corresponding to a RLM operation for beam failure detection, which may support improved communications between the network entity 105-a and the UE 115-a, improved signaling reliability and throughput, and increased power savings, among other benefits.

The wireless communications system 200 may support communications between the network entity 105-a and the UE 115-a. For example, the network entity 105-a may communicate with the UE 115-a over a communication link 205, which may be an example of a communication link 125 described with reference to FIG. 1. In some examples, the network entity 105-a may operate using different energy saving modes, which may save energy at the network entity 105-a. An energy saving mode may correspond to any technique the network entity 105-a may use to reduce its capabilities to save power. For example, the network entity 105-a may operate in a smaller bandwidth or using a smaller number of antennas. In some examples, different energy saving modes used by the network entity 105-a may impact RLM operations performed by the UE 115-a.

To adapt an RLM operation to different energy saving modes of the network entity 105-a, the UE 115-a may receive a first message 210 indicating that the network entity 105-a is operating in a first energy saving mode, which may be one of multiple energy saving modes. In addition, the UE 115-a may receive information 215 indicative of multiple sets of parameters for an RLM operation pertaining to the wireless communications between the network entity 105-a and the UE 115-a. In some examples, each set of parameters may correspond to an energy saving mode of the multiple energy saving modes. That is, the RLM operation may be associated with different parameters depending on which energy saving mode the network entity 105-a is operating in.

In some examples, each set of parameters may include one or more parameters such as a maximum beam failure instance count parameter (e.g., beamFailureInstanceMax-Count), a beam failure detection timer parameter (e.g., beamFailureDetectionTimer), an in-sync threshold parameter (e.g., Q_in) and an out-of-sync threshold parameter (e.g., Q_out), among other parameters. For example, the information 215 may include an indication of a maximum beam failure instance count, each maximum beam failure instance count being specific to a respective energy saving mode. The maximum beam failure instance count may represent a value with which the UE 115-a may compare a beam failure instance counter (e.g., BFI_COUNTER) value as part of the RLM operation. Additionally, the beam failure detection timer parameter may indicate a beam failure detection timer that the UE 115-a may initiate as part of the RLM operation and while the network entity 105-a is operating in a particular energy saving mode. In some examples, the set of parameters may indicate a maximum value pertaining to a timing for determined beam failure corresponding to a particular beam failure detection timer. In addition, each set of parameters may include an in-sync threshold and an out-of-sync threshold specific to a particular energy saving mode, where the UE 115-a may use the in-sync and out-of-sync thresholds to evaluate a downlink reliability of a channel (e.g., the communication link 205) for wireless communication between the UE 115-a and the network entity 105-a. Additional details related to how the UE 115-a may use each parameter in the RLM operation are described with reference to FIG. 3 below.

The UE 115-a may perform the RLM operation using one or more parameters of a first set of parameters associated with the first energy saving mode. For example, the UE 115-a may initiate a first beam failure detection timer while the network entity 105-a is operating in the first energy saving mode, and the UE 115-a may detect one or more beam failure instances during the duration of the first beam failure detection timer. Based on other parameters of the first set of parameters associated with the first energy saving mode (e.g., a maximum beam failure instance count, a maximum value pertaining to the first beam failure detection timer), the UE 115-a may continue or restart the first beam failure detection timer, declare a beam failure, or preform another operation associated with the RLM operation.

In some examples, the UE 115-a may receive a second message 220 (e.g., DCI) indicating that the network entity 105-a is to switch from the first energy saving mode to a second energy saving mode, the second energy saving mode being one of the multiple energy saving modes. For example, the network entity 105-a may enter the second energy saving mode based on a lower traffic load in the wireless communications system 200, which may cause the network entity 105-a to enter a deeper sleep mode corresponding to the second energy saving mode than in the first energy saving mode. The second energy saving mode may be associated with a second set of parameters of the multiple sets of parameters, which may differ from the first set of parameters. In some examples, upon the network entity 105-a switching from the first energy saving mode to the second energy saving mode, the UE 115-a may restart the beam failure instance counter, increase, decrease, or otherwise modify a value of the beam failure counter (e.g., by a value based on the current energy saving mode and the previous energy saving mode), or declare a beam failure and begin a beam recovery operation (e.g., if the value of the beam failure counter exceeds a maximum beam failure instance count associated with the second energy saving mode).

Due to the reduced capabilities of the network entity 105-a while the network entity 105-a operates in an energy saving mode, the UE 115-a may experience a decreased signal interference-to-noise ratio (SINR) associated with beams (e.g., SSB beams, CSI-RS beams) configured for the RLM operation, where the decreased SINR may be a result of the reduced capabilities instead of an actual beam failure. To detect a beam failure instance (e.g., instead of a decreased SINR due to the reduced capabilities), the UE 115-a may identify (e.g., via signaling from a lower layer to a higher layer) whether a beam is in-sync or out-of-sync based on a configured in-sync threshold (e.g., Q_in) and a configured out-of-sync threshold (e.g., Q_out), which may be indicated in a set of parameters corresponding to a respective energy saving mode. For example, the UE 115-a may receive the information 215 which may include an indication of an in-sync threshold and an out-of-sync threshold, each threshold being specific to a respective energy saving mode. The UE 115-a may use the in-sync threshold and the out-of-sync threshold to evaluate a downlink reliability of a channel (e.g., the communication link 205) for wireless communication between the UE 115-a and the network entity 105-a. In some examples, the in-sync threshold and the out-of-sync threshold may be configured independently (e.g., via an RRC configuration), or the thresholds may be configured by applying an offset to a previous in-sync threshold and a previous out-of-sync threshold.

Upon receiving the second message 220 indicating that the network entity 105-a is to switch from operating using the first energy saving mode to operating using the second energy saving mode, the UE 115-a may use a particular in-sync threshold and a particular out-of-sync threshold to evaluate the downlink reliability of the channel and subsequently signal whether one or more beams are in-sync or out-of-sync. Once the lower layer signals an indication of whether a beam is in-sync or out-of-sync to a higher layer, the UE may increment the value of the beam failure instance counter based on whether the beam satisfies the in-sync threshold or the out-of-sync threshold. For example, upon receiving the second message 220, the UE may set an in-sync threshold and an out-of-sync threshold for determining the channel reliability of the wireless communications between the UE 115-*a* and the network entity 105-*a* based on the second set of parameters associated with the second energy saving mode, where the set in-sync and out-of-sync thresholds may be included in the second set of parameters. In addition, the UE 115-*a* may re-evaluate previous in-sync and out-of-sync determinations based on the in-sync threshold or the out-of-sync threshold from the second set of parameters. That is, the UE 115-*a* may re-evaluate whether a beam is in-sync or out-of-sync while the network entity operated in the first energy saving mode (e.g., a previous energy saving mode) and identify and count a corresponding beam failure instance based on the in-sync threshold and the out-of-sync threshold.

By performing the RLM operation using different parameters associated with different energy saving modes of the network entity 105-*a*, communications between the network entity 105-*a* and the UE 115-*a* may be improved. For example, using different parameters corresponding to the different energy saving modes may enable more efficient RLM operations, which may decrease a probability of beam failure, resulting in more reliable communications between the network entity 105-*a* and a UE 115-*a*. In addition, the UE 115-*a* may use the rules described herein while engaging in beam failure detection when the network entity 105-*a* changes from a first energy saving mode to another energy saving mode (e.g., thus changing the effective parameters for RLM at the UE 115-*a*), where the rules may provide for how a beam failure instance counter is to be updated at the time of the change. As such, the beam failure detection may be more accurate and efficient, which may increase a reliability and throughput of communications and increase power savings at the network entity 105-*a*, among other benefits.

Figure 3:
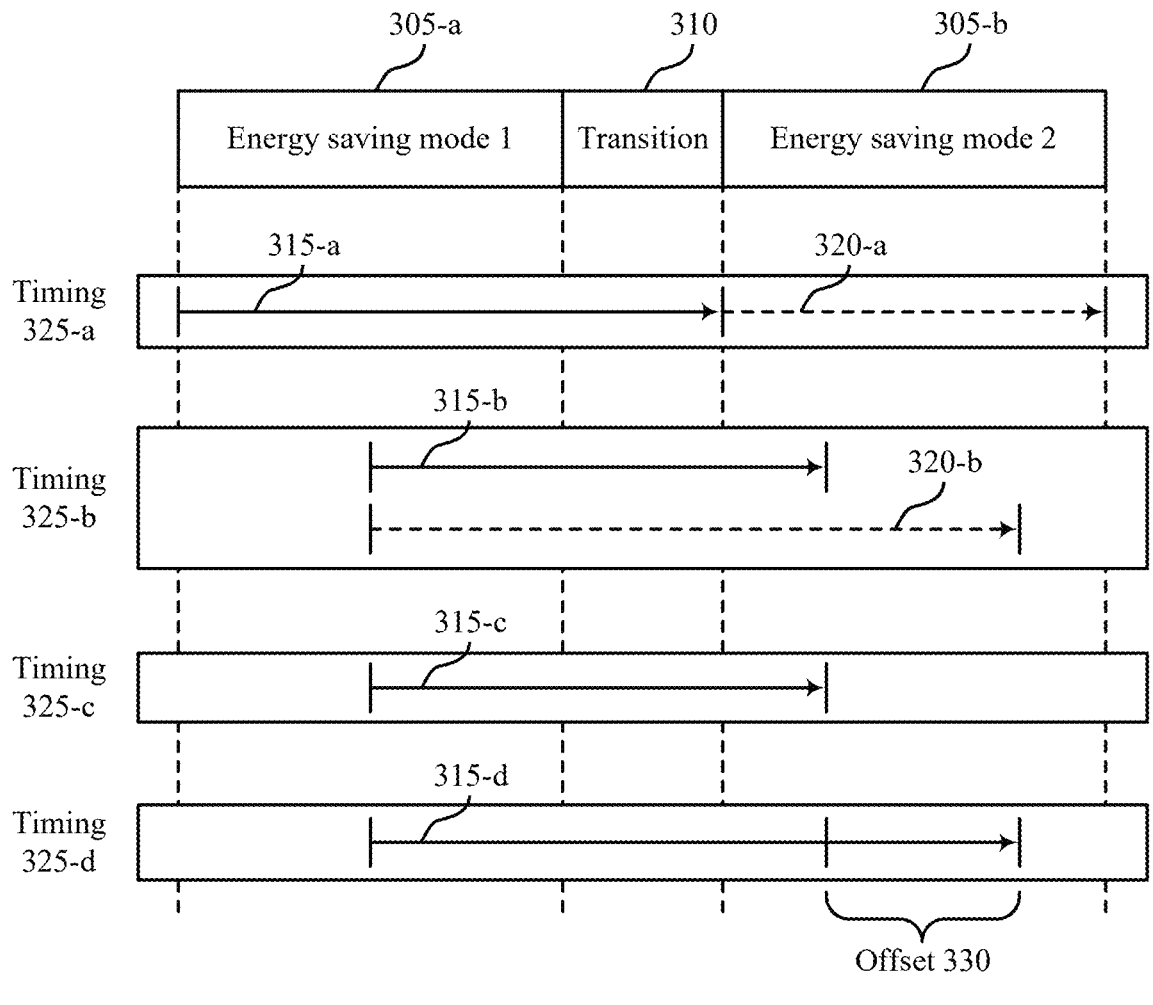
FIG. 3 illustrates an example of a timer that supports RLM and beam failure detection for energy saving modes in accordance with one or more aspects of the present disclosure.

FIG. 3 illustrates an example of a timer 300 that supports RLM and beam failure detection for energy saving modes in accordance with one or more aspects of the present disclosure. In some examples, the timer 300 may implement aspects of the wireless communications systems 100 and 200 or may be implemented by aspects of the wireless communications systems 100 and 200. For example, a UE may initiate one or multiple beam failure detection timers (e.g., beam failure detection timers 315, beam failure detection timers 320) as part of an RLM operation based on which energy saving mode the network entity 105-*a* is operating in.

As described with reference to FIG. 2, a UE may receive a message from a network entity indicating that the network entity is operating in an energy saving mode 305-*a* (e.g., a first energy saving mode of multiple possible energy saving modes, energy saving mode 1). In addition, the UE may receive information indicative of multiple sets of parameters for an RLM operation pertaining to wireless communications between the network entity and the UE, where each set of parameters of the multiple sets is associated with a different energy saving mode 305. In some examples, each set of parameters may include one or more of a beam failure instance counter parameter (e.g., BFI_COUNTER), a beam failure detection timer parameter (e.g., beamFailureDetectionTimer), a maximum beam failure instances count parameter (e.g., beamFailureInstanceMaxCount), an in-sync threshold parameter (e.g., Q_in), and an out-of-sync threshold parameter (e.g., Q_out), among other parameters.

In some examples, with each of the multiple sets of parameters, the UE may receive an indication of a corresponding maximum beam failure instance count, each maximum beam failure instance count being specific to a respective energy saving mode 305. The maximum beam failure instance count may represent a value with which the UE compares a beam failure instance counter value as part of the RLM operation. For example, the UE may count a number of beam failure instances over a particular time period using the beam failure instance counter, and if the number of beam failure instances (e.g., the beam failure instance counter value) exceeds the maximum beam failure instance count for that particular energy saving mode 305, then the UE may declare a beam failure. As such, the UE may perform the RLM operation using one or more parameters of the first set of parameters associated with the energy saving mode 305-*a*.

In some cases, the network entity may switch from operating in the energy saving mode 305-*a* associated with a first set of parameters to operating in an energy saving mode 305-*b* (e.g., a second energy sabing mode) associated with a second set of parameters during a transition 310, where the second set of parameters may be different from the first set of parameters. For example, the UE may receive a message indicating that the network entity is to switch from operating in the energy saving mode 305-*a* to operating in the energy saving mode 305-*b*. Based on the second set of parameters associated with the energy saving mode 305-*b*, the UE may set a maximum beam failure instance count value for the RLM operation. The maximum beam failure instance count value may represent how many beam failure instances may occur in a particular time period before the UE may declare a beam failure.

The UE may increase the efficiency and accuracy of the RLM operation and beam failure detection using the sets of parameters corresponding to specific energy saving modes 305 in which the network entity may operate. For example, the UE may initiate a beam failure instance counter as part of the RLM operation while the network entity is operating in the energy saving mode 305-*a*. The UE may increment the beam failure instance counter during the RLM operation, which may include the UE increasing a value of the beam failure instance counter each time the UE detects a beam failure instance over a given time period. When the network entity switches to operation in the energy saving mode 305-*b*, the UE may reinitiate the beam failure instance counter. Alternatively, the UE may modify a count of the beam failure instance counter by a value based on the network entity switching from operation in the energy saving mode 305-*a* to operation in the energy saving mode 305-*b* via the transition 310. In some examples, the UE may determine whether to declare beam failure based on a comparison of the value of the beam failure instance counter with the maximum beam failure instance count value associated with the energy saving mode 305-*b*, the comparison occurring at or after the network entity switching from operation in the energy saving mode 305-*a* to operation in the energy saving mode 305-*b*.

In some examples, the UE may use one or more beam failure detection timers (e.g., a beam failure detection timer 315, a beam failure detection timer 320) as part of the RLM operation and while the network entity is operating in a particular energy saving mode 305. For example, the UE may initiate a beam failure detection timer 315 (e.g., a first beam failure detection timer, a beam failure detection timer 1) as part of the RLM operation and while the network entity is operating in the energy saving mode 305-*a*. The beam failure detection timer 315 may have a first maximum value pertaining to a timing 325 for determining beam failure, where the first maximum value of the beam failure detection timer 315 may be identified in the first set of parameters corresponding to the energy saving mode 305-*a*. In some examples, the UE may run the beam failure detection timer 315, and at a time when the network entity switches from operation in the energy saving mode 305-*a* to operation in the energy saving mode 305-*b*, the beam failure detection timer 315 may still be running (e.g., may not expire). As such, the UE may determine whether to adjust the timing 325 for determining the beam failure based on the network entity switching energy saving modes 305 (e.g., instead of explicitly declaring beam failure).

In some examples, the UE may reset the beam failure detection timer 315 upon the network entity switching from operating in the energy saving mode 305-*a* to operating in the energy saving mode 305-*b*. For example, the UE may initiate a beam failure detection timer 315-*a* (e.g., a first beam failure detection timer) as part of the RLM operation while the network entity is operating in the energy saving mode 305-*a*. The beam failure detection timer 315-*a* may have a first maximum value pertaining to a timing 325-*a* for determining beam failure, where the first maximum value may be included in the first set of parameters. The UE may run the beam failure detection timer 315-*a* until the end of the transition 310 at which point the network entity may switch from operating in the energy saving mode 305-*a* to operating in the energy saving mode 305-*b*. Based on the network switching, the UE may reset the timing 325-*a* by initiating a beam failure detection timer 320-*a* (e.g., a second beam failure detection timer, a beam failure detection timer 2), where the beam failure detection timer 320-*a* has a second maximum value pertaining to the timing 325-*a*, the second maximum value indicated in a second set of parameters corresponding to the energy saving mode 305-*b*. That is, the beam failure detection timer 315-*a* may end and the beam failure detection timer 320-*b* may start at the time that the network entity switches from operating in the energy saving mode 305-*a* to operating in the energy saving mode 305-*b*.

Alternatively, if a beam failure detection timer 320-*b* started while a beam failure detection timer 315-*b* is running (e.g., while the network entity is operating in the energy saving mode 305-*a*), the UE may use the beam failure detection timer 320-*b* for the RLM operation. For example, the UE may initiate the beam failure detection timer 315-*b* as part of the RLM operation while the network entity is operating in the energy saving mode 305-*a*. The beam failure detection timer 315-*b* may have a first maximum value pertaining to a timing 325-*b* for determining beam failure, where the first maximum value may be included in the first set of parameters. The UE may run the beam failure detection timer 315-*b*, and upon the network entity switching from operating in the energy saving mode 305-*a* to operating in the energy saving mode 305-*b*, the UE may initiate the beam failure detection timer 320-*b* as if the beam failure detection timer 320-*b* was started at a same time as the beam failure detection timer 315-*b*. The beam failure detection timer 320-*b* may have a second maximum value pertaining to the timing 325-*b*, the second maximum value included in the second set of parameters. In some examples, if the beam failure detection timer 320-*b* has a shorter duration than the beam failure detection timer 315-*b*, the UE may run the beam failure detection timer 320-*b* as if the beam failure detection timer 320-*b* was started at a same time as the beam failure detection timer 315-*b* until the beam failure detection timer 320-*b* expires, at which point the UE may restart the beam failure detection timer 320-*b* upon detecting a beam failure instance.

Alternatively, the UE may follow a beam failure detection timer 315-*c* until it resets or expires. The UE may initiate the beam failure detection timer 315-*c* as part of the RLM operation while the network entity is operating in the energy saving mode 305-*a*. The beam failure detection timer 315-*c* may have a first maximum value pertaining to a timing 325-*c* for determining beam failure, where the first maximum value may be included in the first set of parameters. The UE may run the beam failure detection timer 315-*c*, where the beam failure detection timer 315-*c* may continue to run at a time when the network entity switches from operations in the energy saving mode 305-*a* to operation in the energy saving mode 305-*b*. In some examples, the UE may maintain the timing 325-*c* by allowing the beam failure detection timer 315-*c* to continue running until the beam failure detection timer 315-*c* either resets or expires, which may be while the network entity is operating using the energy saving mode 305-*a* or the energy saving mode 305-*b*.

Alternatively, the UE may add an offset 330 (e.g., a configured delta) to a beam failure detection timer 315-*d*, where the offset 330 may be based on the network entity operating in the energy saving mode 305-*a* (e.g., a current energy saving mode) or the energy saving mode 305-*b* (e.g., a next energy saving mode). For example, the UE may initiate the beam failure detection timer 315-*d* as part of the RLM operation while the network entity is operating in the energy saving mode 305-*a*. The beam failure detection timer 315-*d* may have a first maximum value pertaining to a timing 325-*d* for determining beam failure, where the first maximum value may be included in the first set of parameters. The UE may run the beam failure detection timer 315-*d*, and upon the network entity switching from operating in the energy saving mode 305-*a* to operating in the energy saving mode 305-*b*, the beam failure detection timer 315-*d* may continue running. In some examples, the UE may apply the offset 330 to the first maximum value of the beam failure detection timer 315-*d* such that the timing 325-*d* is equal to a second maximum value identified in the second set of parameters and associated with the energy saving mode 305-*b*. For example, if the beam failure detection timer 315-*d* has a duration of 5 s, which may expire before the network entity switches from operating in the energy saving mode 305-*a* to the energy saving mode 305-*b*, the UE may add the offset 330 to the timing 325-*d* such that the UE may continue running the beam failure detection timer 315-*d* while the network entity operates in the energy saving mode 305-*b*. In some cases, the offset 330 may decrease the duration of the beam failure detection timer 315-*d*.

During a particular beam failure detection timer 315 or a particular beam failure detection timer 320, the UE may perform the RLM operation depending on the network entity operating in an energy saving mode 305. If the UE follows a beam failure detection timer 315 corresponding to the energy saving mode 305-*a*, the UE may use the first set of parameters for the RLM operation, including one or more of a beam failure instance counter parameter, a maximum beam failure instances count parameter, an in-sync threshold (e.g., Q_in), and an out-of-sync threshold (e.g., Q_out) that are also associated with the beam failure detection timer 315. For example, the UE may count a number of beam failure instances over the duration of the beam failure detection timer 315, and if the number of beam failure instances (e.g., the beam failure instance counter value) exceeds the maximum beam failure instance count for the energy saving mode 305-*a*, then the UE may declare a beam failure, increment the beam failure instance counter, or perform another action as a part of the RLM operation. Similarly, the UE may use the second set of parameters while the network entity operates in the energy saving mode 305-*b* and following a beam failure detection timer 320.

Figure 4:
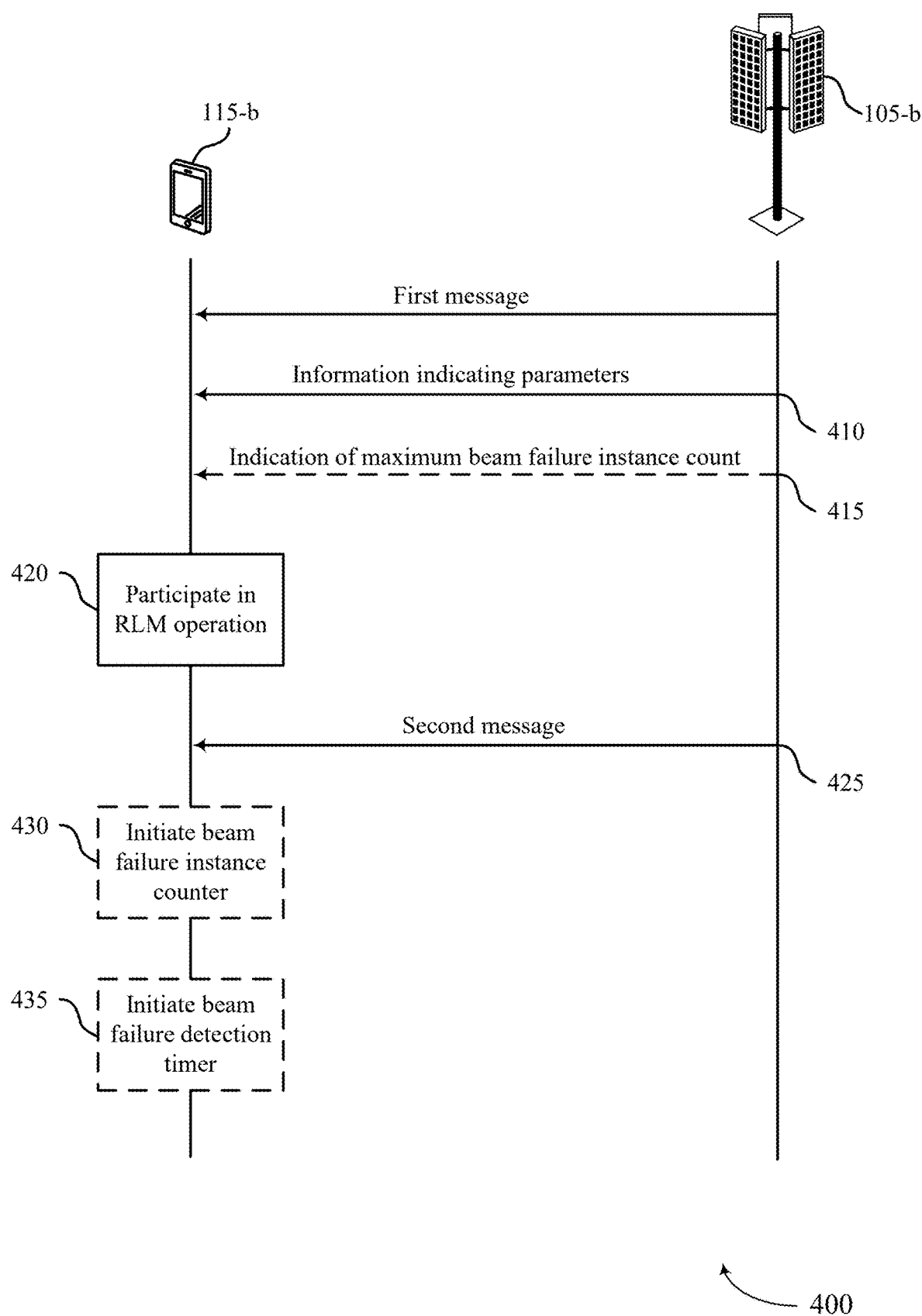
FIG. 4 illustrates an example of a process flow that supports RLM and beam failure detection for energy saving modes in accordance with one or more aspects of the present disclosure.

FIG. 4 illustrates an example of a process flow 400 that supports RLM and beam failure detection for energy saving modes in accordance with one or more aspects of the present disclosure. The process flow 400 may implement aspects of wireless communications systems 100 and 200, or may be implemented by aspects of the wireless communications system 100 and 200. For example, the process flow 400 may illustrate operations between a network entity 105-b and a UE 115-b, which may be examples of corresponding devices described herein. In the following description of the process flow 400, the operations between the network entity 105-b and the UE 115-b may be transmitted in a different order than the example order shown, or the operations performed by the network entity 105-b and the UE 115-b may be performed in different orders or at different times. Some operations may also be omitted from the process flow 400, and other operations may be added to the process flow 400.

At 405, the UE 115-b may receive a first message indicating that the network entity 105-b in wireless communication with the UE 115-b is operating in a first energy saving mode, where the first energy saving mode is one of multiple energy saving modes. Operations of the network entity 105-b in the first energy saving mode may correspond to any technique the network entity 105-b may use to reduce its capabilities to save power. For example, the network entity 105-b may operate in a smaller bandwidth or using fewer antennas in the first energy saving mode.

At 410, the UE 115-b may receiving information indicative of multiple sets of parameters for a RLM operation pertaining to the wireless communications between the UE 115-b and the network entity 105-b. Each of the multiple sets of parameters may be associated with a different energy saving mode of the multiple energy saving modes. In some examples, a set of parameters may include one or more of a beam failure instance counter parameter (e.g., BFI_COUNTER), a beam failure detection timer parameter (e.g., beamFailureDetectionTimer), a maximum beam failure instances count parameter (e.g., beamFailureInstanceMaxCount), an in-sync threshold (e.g., Q_in), and an out-of-sync threshold (e.g., Q_out).

At 415, the UE 115-b may receive, with each of the multiple sets of parameters, an indication of a maximum beam failure instance count (e.g., corresponding to the beamFailureInstanceMaxCount parameter), each of the maximum beam failure instance counts being specific to a respective energy saving mode of the multiple energy saving modes. The maximum beam failure instance count may represent a value with which the UE 115-b compares a beam failure instance counter value as part of the RLM operation. That is, the beam failure instance counter value may represent a quantity of beam failure instances a UE may detect in a given time period. The UE 115-b may compare the beam failure instance counter value to a maximum beam failure instance count to determine whether or not to declare a beam failure.

At 420, the UE 115-b may perform the RLM operation using one or more parameters of a first set of parameters associated with the first energy saving mode. In some examples, the RLM operation may include beam failure detection, in which the UE 115-b may use an in-sync threshold and an out-of-sync threshold to evaluate a downlink reliability of a channel for the wireless communications between the UE 115-b and the network entity 105-b. For example, the UE 115-b may declare a beam failure based on comparing a beam with the in-sync threshold and the out-of-sync threshold.

At 425, the UE 115-b may receive a second message from the network entity 105-b indicating that the network entity 105-b is to switch from operating in the first energy saving mode to operating in a second energy saving mode. The second energy saving mode may be one of the multiple energy saving modes, and may be associated with a second set of parameters of the multiple sets of parameters. As such, the UE 115-b may use the second set of parameters to perform the RLM operation while the network entity 105-b operates in the second energy saving mode.

At 430, the UE 115-b may initiate a beam failure instance counter as part of the RLM operation and while the network entity 105-b is operating in the first energy saving mode. The UE 115-b may increment the beam failure instance counter, and re-initiate the beam failure instance counter based on the network entity 105-b switching from operating using the first energy saving mode to operating in the second energy saving mode. Accordingly, the UE 115-b may count a quantity of detected beam failure instances over a given time period.

At 435, the UE 115-b may initiate a first beam failure detection timer at the UE 115-b as part of the RLM operation and while the network entity 105-b is operating in the first energy saving mode. The first beam failure detection timer may have a first maximum value pertaining to a timing for determining beam failure, the first maximum value of the first beam failure detection timer identified in the first set of parameters. In some examples, the UE 115-b may run the first beam failure detection timer until the timer resets or expires. Additionally, or alternatively, the UE 115-b may determine whether to adjust the timing for determining beam failure when the network entity 105-b switches from operating in the first energy saving mode to the second energy saving mode. As such, the UE 115-b may perform the RLM operation in accordance with the first beam failure detection timer, during which the UE 115-b may detect one or more beam failure instances and declare a beam failure.

Figure 5:
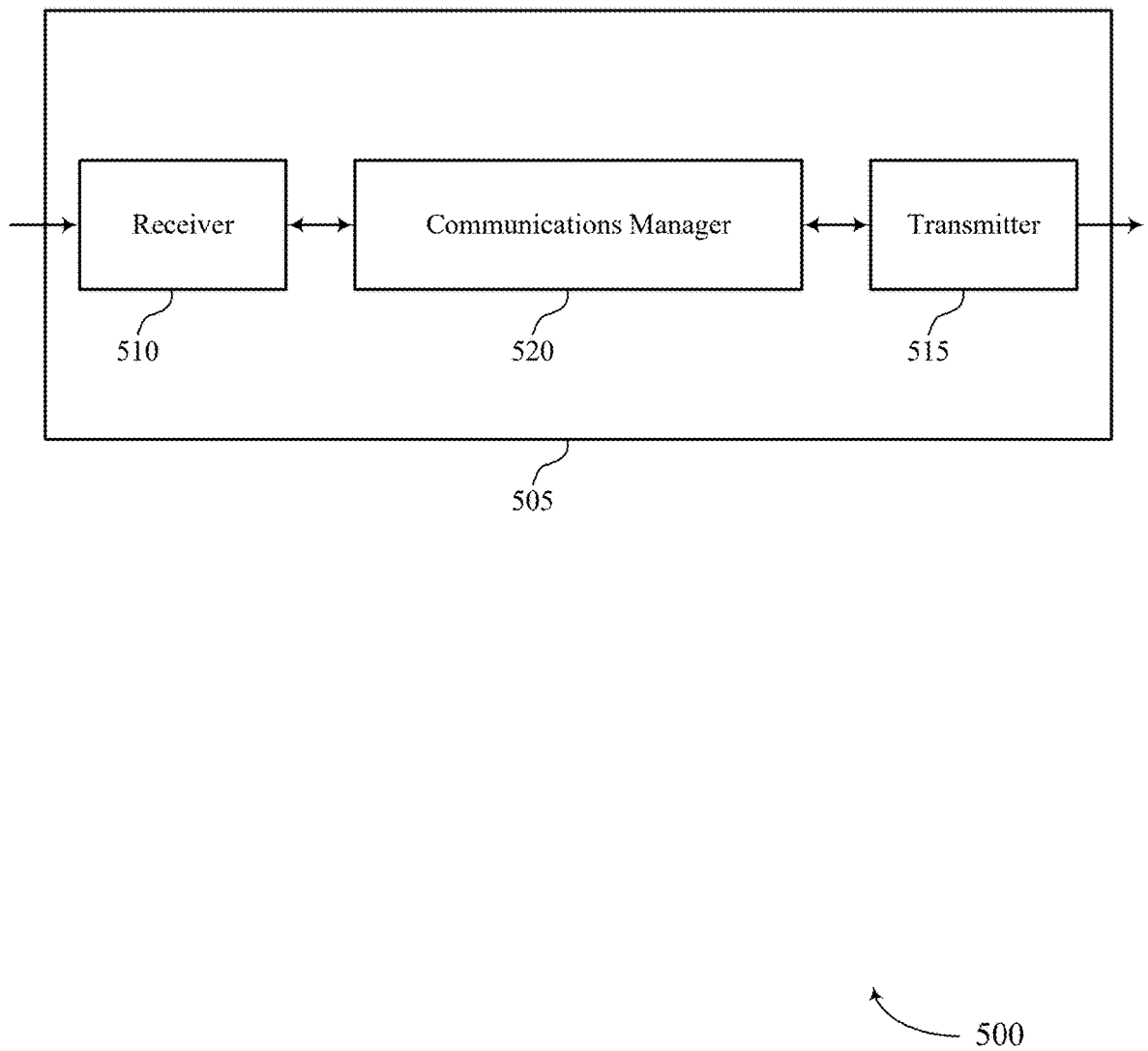
FIGS. 5 and 6 show block diagrams of devices that support RLM and beam failure detection for energy saving modes in accordance with one or more aspects of the present disclosure.

FIG. 5 shows a block diagram 500 of a device 505 that supports RLM and beam failure detection for energy saving modes in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to RLM and beam failure detection for energy saving modes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to RLM and beam failure detection for energy saving modes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of RLM and beam failure detection for energy saving modes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving a first message indicating that a network entity in wireless communication with the UE is operating in a first energy saving mode, where the first energy saving mode is one of a set of multiple energy saving modes. The communications manager 520 may be configured as or otherwise support a means for receiving information indicative of a set of multiple sets of parameters for a RLM operation pertaining to wireless communication between the UE and the network entity, each of the set of multiple sets of parameters being associated with a different energy saving mode of the set of multiple energy saving modes. The communications manager 520 may be configured as or otherwise support a means for performing the RLM operation using one or more parameters of a first set of parameters associated with the first energy saving mode.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for adapting RLM and beam failure detection operations based on a network entity operating in different energy saving modes, which may increase the efficiency and accuracy of the RLM operations, which may reduce the amount of beam failure and increase reliability of communications between the UE and the network entity.

Figure 6:
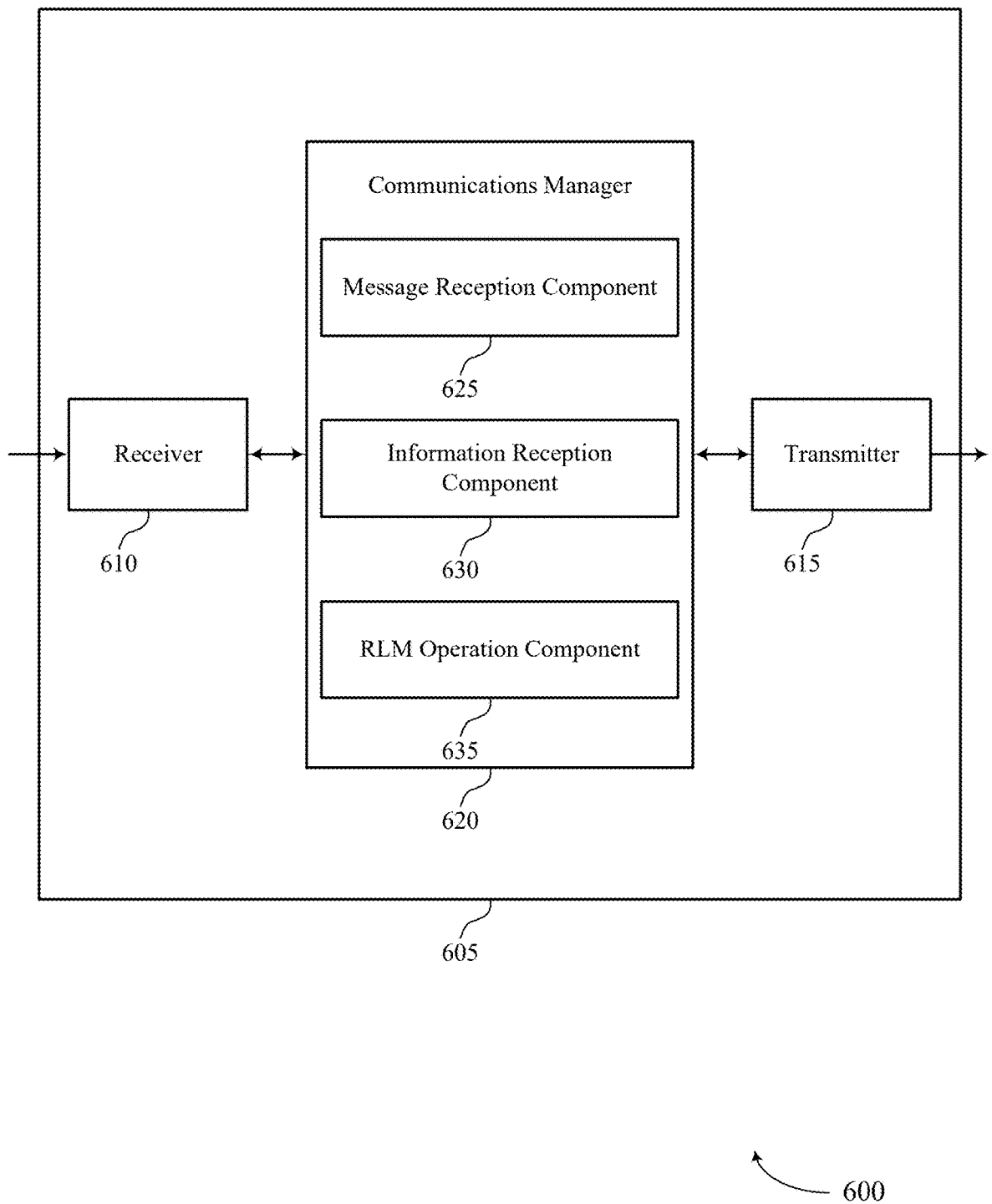

FIG. 6 shows a block diagram 600 of a device 605 that supports RLM and beam failure detection for energy saving modes in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to RLM and beam failure detection for energy saving modes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to RLM and beam failure detection for energy saving modes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of RLM and beam failure detection for energy saving modes as described herein. For example, the communications manager 620 may include a message reception component 625, an information reception component 630, an RLM operation component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The message reception component 625 may be configured as or otherwise support a means for receiving a first message indicating that a network entity in wireless communication with the UE is operating in a first energy saving mode, where the first energy saving mode is one of a set of multiple energy saving modes. The information reception component 630 may be configured as or otherwise support a means for receiving information indicative of a set of multiple sets of parameters for a RLM operation pertaining to wireless communication between the UE and the network entity, each of the set of multiple sets of parameters being associated with a different energy saving mode of the set of multiple energy saving modes. The RLM operation component 635 may be configured as or otherwise support a means for performing the RLM operation using one or more parameters of a first set of parameters associated with the first energy saving mode.

Figure 7:
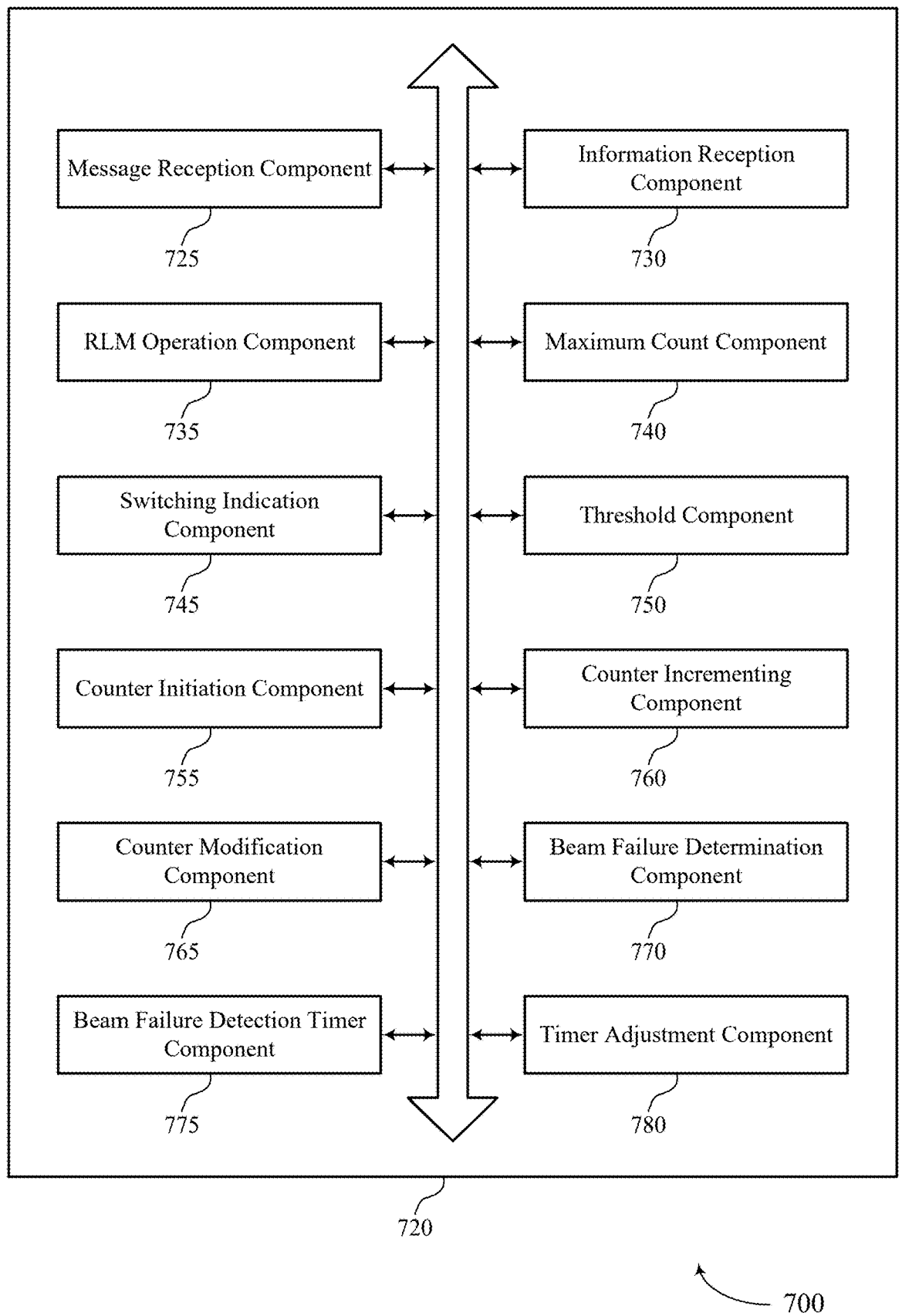
FIG. 7 shows a block diagram of a communications manager that supports RLM and beam failure detection for energy saving modes in accordance with one or more aspects of the present disclosure.

FIG. 7 shows a block diagram 700 of a communications manager 720 that supports RLM and beam failure detection for energy saving modes in accordance with one or more aspects of the present disclosure. The communications manager 720 may be an example of aspects of a communications manager 520, a communications manager 620, or both, as described herein. The communications manager 720, or various components thereof, may be an example of means for performing various aspects of RLM and beam failure detection for energy saving modes as described herein. For example, the communications manager 720 may include a message reception component 725, an information reception component 730, an RLM operation component 735, a maximum count component 740, a switching indication component 745, a threshold component 750, a counter initiation component 755, a counter incrementing component 760, a counter modification component 765, a beam failure determination component 770, a beam failure detection timer component 775, a timer adjustment component 780, or any combination thereof. Each of these components may communicate, directly or indirectly, with one another (e.g., via one or more buses).

The communications manager 720 may support wireless communication at a UE in accordance with examples as disclosed herein. The message reception component 725 may be configured as or otherwise support a means for receiving a first message indicating that a network entity in wireless communication with the UE is operating in a first energy saving mode, where the first energy saving mode is one of a set of multiple energy saving modes. The information reception component 730 may be configured as or otherwise support a means for receiving information indicative of a set of multiple sets of parameters for a RLM operation pertaining to wireless communication between the UE and the network entity, each of the set of multiple sets of parameters being associated with a different energy saving mode of the set of multiple energy saving modes. The RLM operation component 735 may be configured as or otherwise support a means for performing the RLM operation using one or more parameters of a first set of parameters associated with the first energy saving mode.

In some examples, to support receiving the information indicative of the set of multiple sets of parameters, the maximum count component 740 may be configured as or otherwise support a means for receiving, with each of the set of multiple sets of parameters, an indication of a maximum beam failure instance count, each of the maximum beam failure instance counts being specific to a respective energy saving mode of the set of multiple energy saving modes, the maximum beam failure instance count representing a value with which the UE compares a beam failure instance counter value as part of the RLM operation.

In some examples, the switching indication component 745 may be configured as or otherwise support a means for receiving a second message indicating that the network entity is to switch from the first energy saving mode to a second energy saving mode associated with operation of the network entity, where the second energy saving mode is one of the set of multiple energy saving modes. In some examples, the maximum count component 740 may be configured as or otherwise support a means for setting a maximum beam failure instance count value for the RLM operation based on a second set of parameters associated with the second energy saving mode, the second set of parameters being of the set of multiple sets of parameters.

In some examples, the counter initiation component 755 may be configured as or otherwise support a means for initiating a beam failure instance counter at the UE as part of the RLM operation and while the network entity is operating in the first energy saving mode. In some examples, the counter incrementing component 760 may be configured as or otherwise support a means for incrementing the beam failure instance counter as part of the RLM operation. In some examples, the counter initiation component 755 may be configured as or otherwise support a means for re-initiating the beam failure instance counter based on the network entity switching to operation in the second energy saving mode.

In some examples, the counter initiation component 755 may be configured as or otherwise support a means for initiating a beam failure instance counter at the UE as part of the RLM operation and while the network entity is operating in the first energy saving mode. In some examples, the counter incrementing component 760 may be configured as or otherwise support a means for incrementing the beam failure instance counter as part of the RLM operation. In some examples, the counter modification component 765 may be configured as or otherwise support a means for modifying a count of the beam failure instance counter by a value based on the network entity switching from operation in the first energy saving mode to operation in the second energy saving mode.

In some examples, the counter initiation component 755 may be configured as or otherwise support a means for initiating a beam failure instance counter at the UE as part of the RLM operation and while the network entity is operating in the first energy saving mode. In some examples, the counter incrementing component 760 may be configured as or otherwise support a means for incrementing the beam failure instance counter as part of the RLM operation. In some examples, the beam failure determination component 770 may be configured as or otherwise support a means for determining whether to declare beam failure based on a comparison of a value of the beam failure instance counter with the maximum beam failure instance count value associated with the second energy saving mode, the comparison occurring at or after the network entity switching from operation in the first energy saving mode to operation in the second energy saving mode.

In some examples, the beam failure detection timer component 775 may be configured as or otherwise support a means for initiating a first beam failure detection timer at the UE as part of the RLM operation and while the network entity is operating in the first energy saving mode, the first beam failure detection timer having a first maximum value pertaining to a timing for determining beam failure, the first maximum value of the first beam failure detection timer identified in the first set of parameters. In some examples, the beam failure detection timer component 775 may be configured as or otherwise support a means for running the first beam failure detection timer as part of the RLM operation, where at a time of the network entity switching from operation in the first energy saving mode to operation in the second energy saving mode, the first beam failure detection timer is still running. In some examples, the timer adjustment component 780 may be configured as or otherwise support a means for determining whether to adjust the timing for determining beam failure based on the network entity switching from operation in the first energy saving mode to operation in the second energy saving mode.

In some examples, to support determining whether to adjust the timing, the timer adjustment component 780 may be configured as or otherwise support a means for resetting the timing by initiating a second beam failure detection timer at the UE as part of the RLM operation and based on the network entity switching from operation in the first energy saving mode to operation in the second energy saving mode, the second beam failure detection timer having a second maximum value pertaining to the timing for determining beam failure, the second maximum value of the second beam failure detection timer identified in the second set of parameters.

In some examples, to support determining whether to adjust the timing, the timer adjustment component 780 may be configured as or otherwise support a means for initiating a second beam failure detection timer at the UE as if the second beam failure detection timer was started at a same time as the first beam failure detection timer, the second beam failure detection timer having a second maximum value pertaining to the timing for determining beam failure, the second maximum value of the second beam failure detection timer identified in the second set of parameters.

In some examples, to support determining whether to adjust the timing, the timer adjustment component 780 may be configured as or otherwise support a means for maintaining the timing by allowing the first beam failure detection timer to continue until the first beam failure detection timer either resets or expires.

In some examples, to support determining whether to adjust the timing, the timer adjustment component 780 may be configured as or otherwise support a means for applying an offset to the first maximum value of the first beam failure detection timer so that the timing is equal to a second maximum value identified in the second set of parameters associated with the second energy saving mode of the network entity.

In some examples, to support receiving the information indicative of the set of multiple sets of parameters, the threshold component 750 may be configured as or otherwise support a means for receiving, with each of the set of multiple sets of parameters, an indication of an in-sync threshold and an out-of-sync threshold, each of the in-sync thresholds and the out-of-sync thresholds being specific to a respective energy saving mode of the set of multiple energy saving modes, the in-sync thresholds and the out-of-sync thresholds being used to evaluate a downlink reliability of a channel for wireless communications between the UE and the network entity.

In some examples, the threshold component 750 may be configured as or otherwise support a means for receiving a second message indicating that the network entity is to switch from the first energy saving mode to a second energy saving mode associated with operation of the network entity, where the second energy saving mode is one of the set of multiple energy saving modes. In some examples, the threshold component 750 may be configured as or otherwise support a means for setting an in-sync threshold and an out-of-sync threshold for determining channel reliability of the wireless communication between the UE and the network entity based on a second set of parameters associated with the second energy saving mode, the second set of parameters being of the set of multiple sets of parameters.

In some examples, the threshold component 750 may be configured as or otherwise support a means for re-evaluating previous in-sync or out-of-sync determinations based on the in-sync threshold or the out-of-sync threshold from the second set of parameters.

In some examples, to support setting the in-sync threshold and the out-of-sync threshold, the threshold component 750 may be configured as or otherwise support a means for applying an offset to a previous in-sync threshold and a previous out-of-sync threshold associated with the first energy saving mode.

Figure 8:
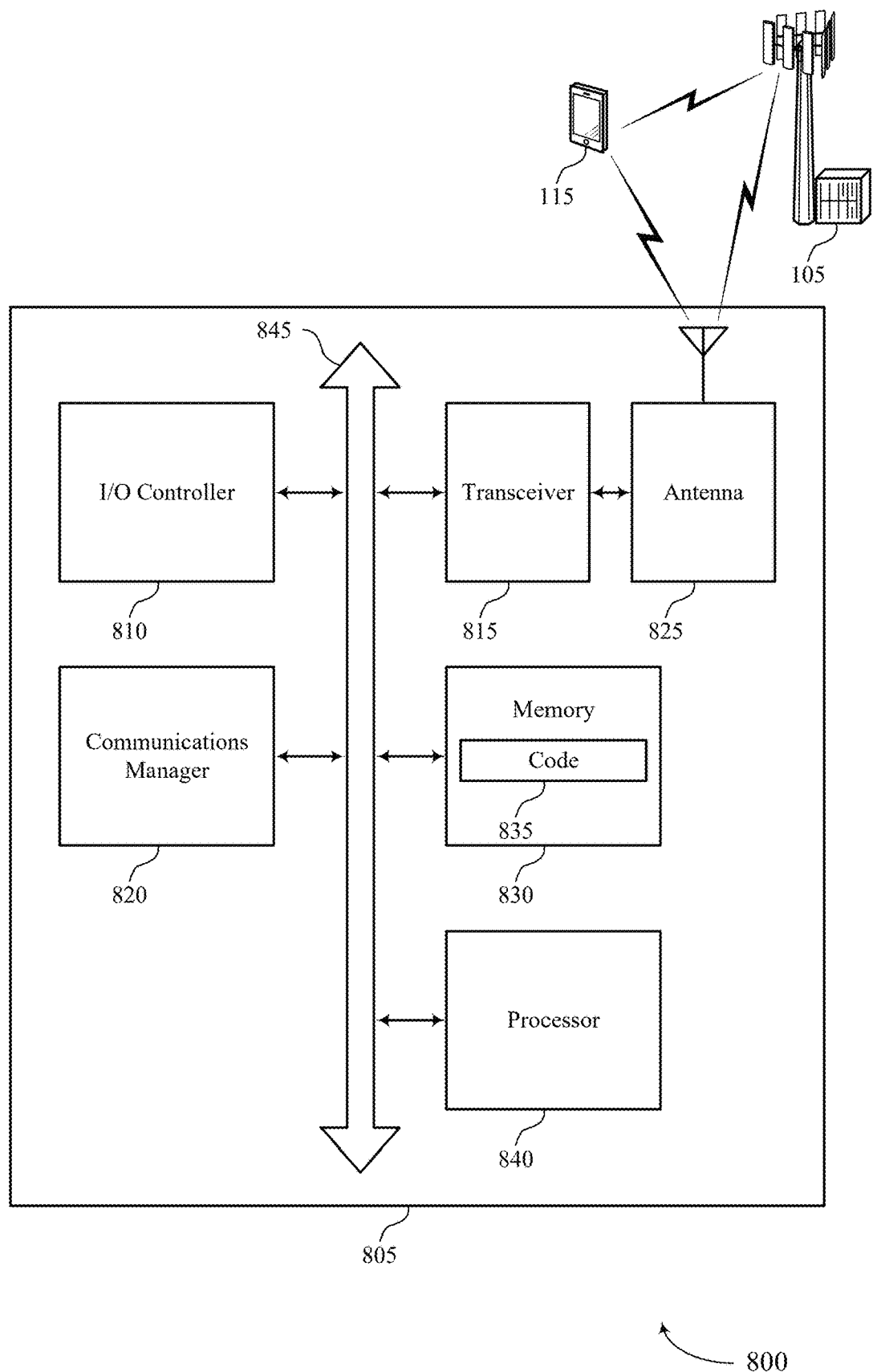
FIG. 8 shows a diagram of a system including a device that supports RLM and beam failure detection for energy saving modes in accordance with one or more aspects of the present disclosure.

FIG. 8 shows a diagram of a system 800 including a device 805 that supports RLM and beam failure detection for energy saving modes in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code

835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting RLM and beam failure detection for energy saving modes). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a first message indicating that a network entity in wireless communication with the UE is operating in a first energy saving mode, where the first energy saving mode is one of a set of multiple energy saving modes. The communications manager 820 may be configured as or otherwise support a means for receiving information indicative of a set of multiple sets of parameters for a RLM operation pertaining to wireless communication between the UE and the network entity, each of the set of multiple sets of parameters being associated with a different energy saving mode of the set of multiple energy saving modes. The communications manager 820 may be configured as or otherwise support a means for performing the RLM operation using one or more parameters of a first set of parameters associated with the first energy saving mode.

By including or configuring the communications manager 820 in accordance with examples as described herein, the device 805 may support techniques for adapting RLM and beam failure detection operations based on a network entity operating in different energy saving modes, which may increase the efficiency and accuracy of the RLM operations, which may reduce the amount of beam failure and increase reliability of communications between the UE and the network entity.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of RLM and beam failure detection for energy saving modes as described herein, or the processor 840 and the memory 830 may be otherwise configured to perform or support such operations.

Figure 9:
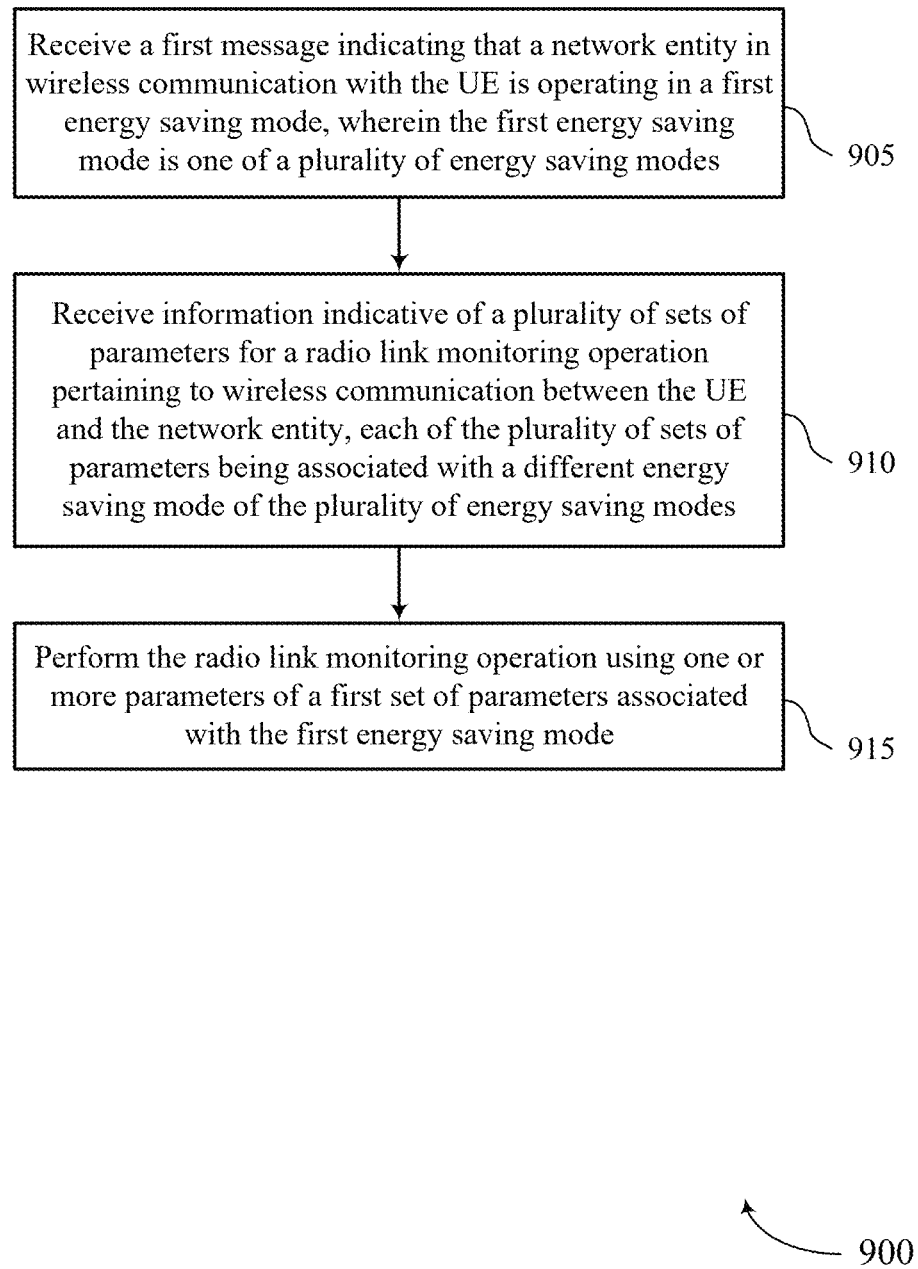
FIGS. 9 through 11 show flowcharts illustrating methods that support RLM and beam failure detection for energy saving modes in accordance with one or more aspects of the present disclosure.

FIG. 9 shows a flowchart illustrating a method 900 that supports RLM and beam failure detection for energy saving modes in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving a first message indicating that a network entity in wireless communication with the UE is operating in a first energy saving mode, where the first energy saving mode is one of a set of multiple energy saving modes. The operations of 905 may be performed in accordance with examples as disclosed herein. In some examples, aspects of the operations of 905 may be performed by a message reception component 725 as described with reference to FIG. 7.

At 910, the method may include receiving information indicative of a set of multiple sets of parameters for a RLM operation pertaining to wireless communication between the UE and the network entity, each of the set of multiple sets of parameters being associated with a different energy saving mode of the set of multiple energy saving modes. The operations of 910 may be performed in accordance with examples as disclosed herein. In some examples, aspects of the operations of 910 may be performed by an information reception component 730 as described with reference to FIG. 7.

At 915, the method may include performing the RLM operation using one or more parameters of a first set of parameters associated with the first energy saving mode. The operations of 915 may be performed in accordance with examples as disclosed herein. In some examples, aspects of the operations of 915 may be performed by an RLM operation component 735 as described with reference to FIG. 7.

Figure 10:
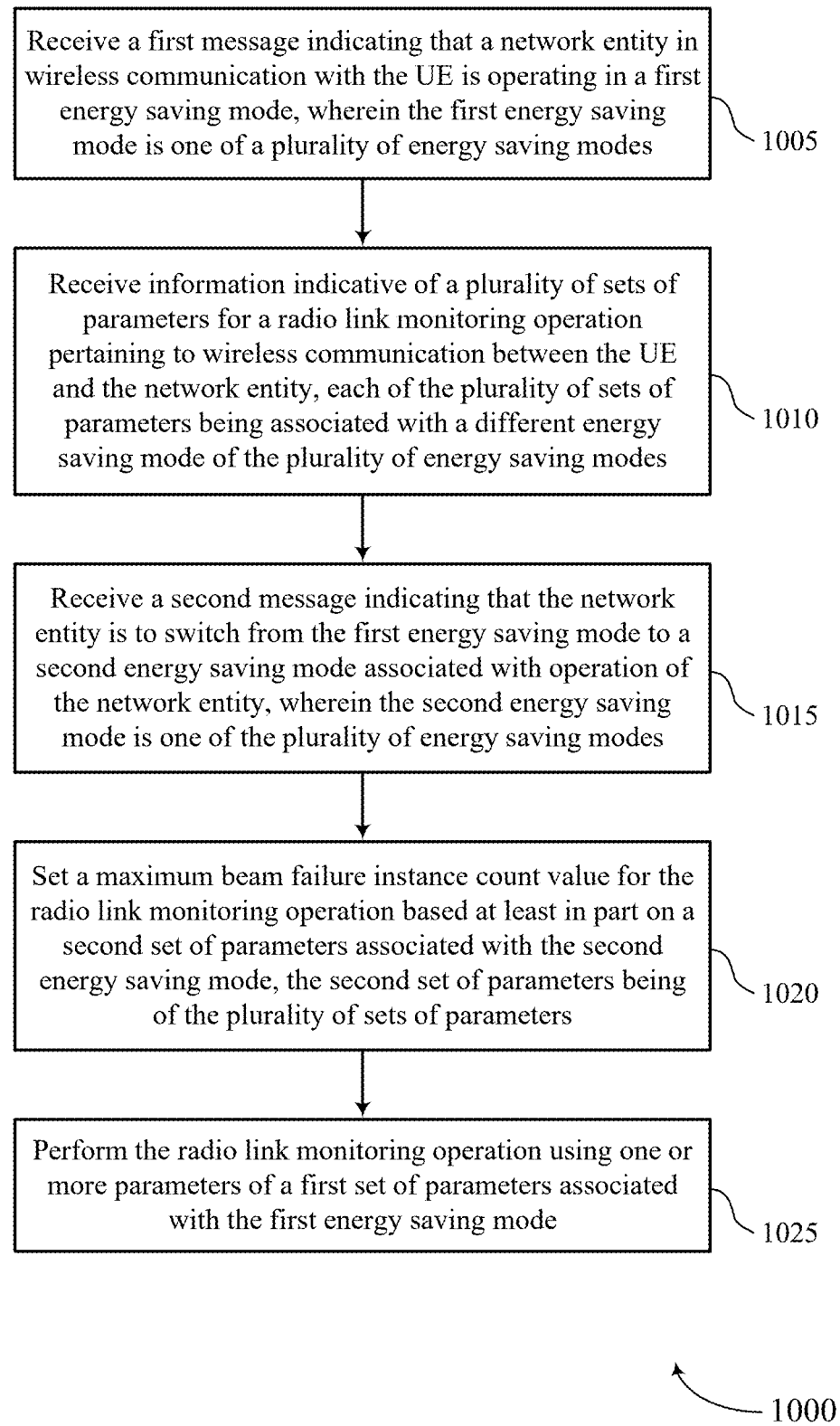

FIG. 10 shows a flowchart illustrating a method 1000 that supports RLM and beam failure detection for energy saving modes in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving a first message indicating that a network entity in wireless communication with the UE is operating in a first energy saving mode, where the first energy saving mode is one of a set of multiple energy saving modes. The operations of 1005 may be performed in accordance with examples as disclosed herein. In some examples, aspects of the operations of 1005 may be performed by a message reception component 725 as described with reference to FIG. 7.

At 1010, the method may include receiving information indicative of a set of multiple sets of parameters for a RLM operation pertaining to wireless communication between the UE and the network entity, each of the set of multiple sets of parameters being associated with a different energy saving mode of the set of multiple energy saving modes. The operations of 1010 may be performed in accordance with examples as disclosed herein. In some examples, aspects of the operations of 1010 may be performed by an information reception component 730 as described with reference to FIG. 7.

At 1015, the method may include receiving a second message indicating that the network entity is to switch from the first energy saving mode to a second energy saving mode associated with operation of the network entity, where the second energy saving mode is one of the set of multiple energy saving modes. The operations of 1015 may be performed in accordance with examples as disclosed herein. In some examples, aspects of the operations of 1015 may be performed by a switching indication component 745 as described with reference to FIG. 7.

At 1020, the method may include setting a maximum beam failure instance count value for the RLM operation based on a second set of parameters associated with the second energy saving mode, the second set of parameters being of the set of multiple sets of parameters. The operations of 1020 may be performed in accordance with examples as disclosed herein. In some examples, aspects of the operations of 1020 may be performed by a maximum count component 740 as described with reference to FIG. 7.

At 1025, the method may include performing the RLM operation using one or more parameters of a first set of parameters associated with the first energy saving mode. The operations of 1025 may be performed in accordance with examples as disclosed herein. In some examples, aspects of the operations of 1025 may be performed by an RLM operation component 735 as described with reference to FIG. 7.

Figure 11:
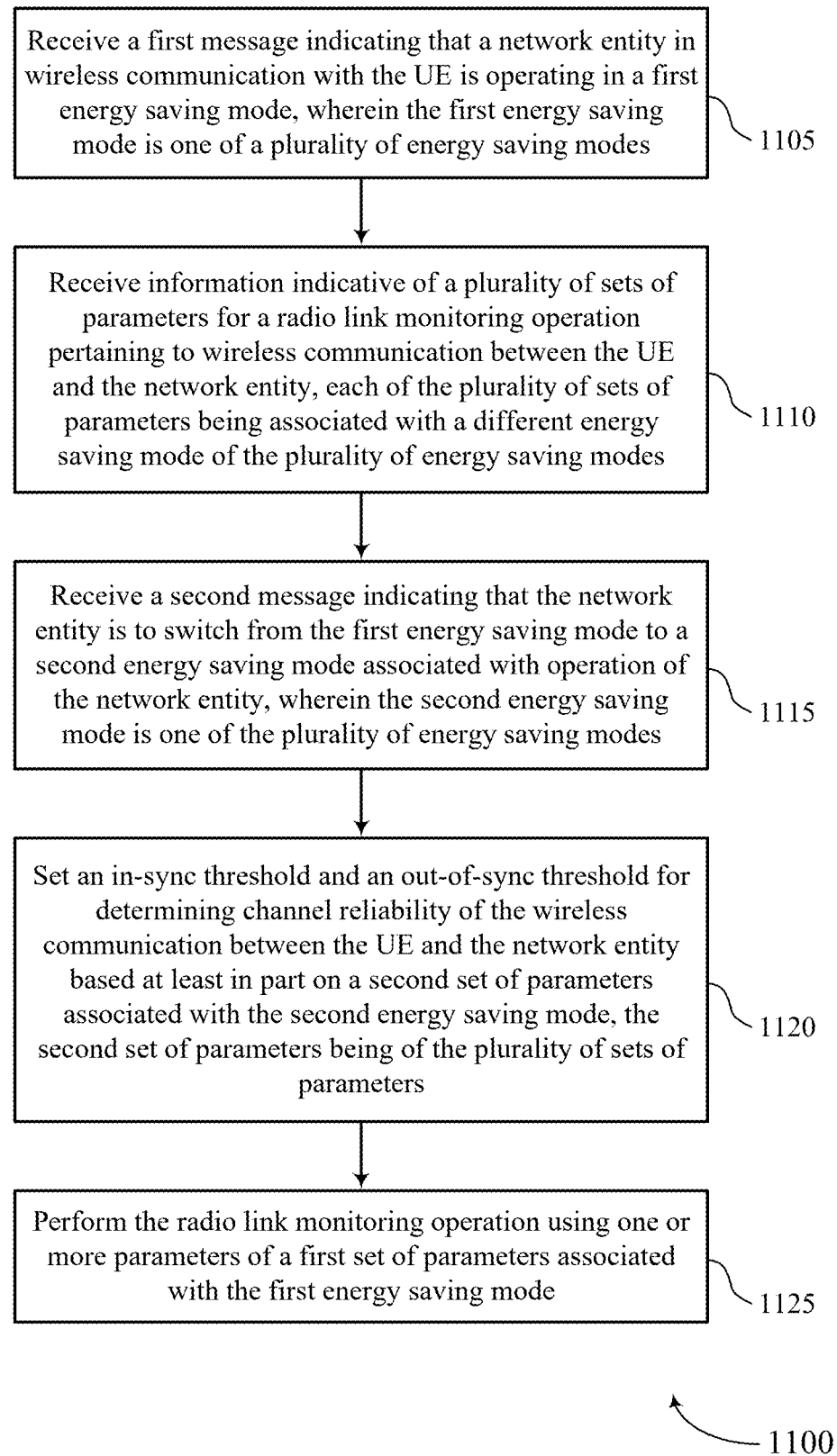

FIG. 11 shows a flowchart illustrating a method 1100 that supports RLM and beam failure detection for energy saving modes in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving a first message indicating that a network entity in wireless communication with the UE is operating in a first energy saving mode, where the first energy saving mode is one of a set of multiple energy saving modes. The operations of 1105 may be performed in accordance with examples as disclosed herein. In some examples, aspects of the operations of 1105 may be performed by a message reception component 725 as described with reference to FIG. 7.

At 1110, the method may include receiving information indicative of a set of multiple sets of parameters for a RLM operation pertaining to wireless communication between the UE and the network entity, each of the set of multiple sets of parameters being associated with a different energy saving mode of the set of multiple energy saving modes. The operations of 1110 may be performed in accordance with examples as disclosed herein. In some examples, aspects of the operations of 1110 may be performed by an information reception component 730 as described with reference to FIG. 7.

At 1115, the method may include receiving a second message indicating that the network entity is to switch from the first energy saving mode to a second energy saving mode associated with operation of the network entity, where the second energy saving mode is one of the set of multiple energy saving modes. The operations of 1115 may be performed in accordance with examples as disclosed herein. In some examples, aspects of the operations of 1115 may be performed by a threshold component 750 as described with reference to FIG. 7.

At 1120, the method may include setting an in-sync threshold and an out-of-sync threshold for determining channel reliability of the wireless communication between the UE and the network entity based on a second set of parameters associated with the second energy saving mode, the second set of parameters being of the set of multiple sets of parameters. The operations of 1120 may be performed in accordance with examples as disclosed herein. In some examples, aspects of the operations of 1120 may be performed by a threshold component 750 as described with reference to FIG. 7.

At 1125, the method may include performing the RLM operation using one or more parameters of a first set of parameters associated with the first energy saving mode. The operations of 1125 may be performed in accordance with examples as disclosed herein. In some examples, aspects of the operations of 1125 may be performed by an RLM operation component 735 as described with reference to FIG. 7.

The following provides an overview of aspects of the present disclosure:

Aspect 1: A method for wireless communication at a UE, comprising: receiving a first message indicating that a network entity in wireless communication with the UE is operating in a first energy saving mode, wherein the first energy saving mode is one of a plurality of energy saving modes; receiving information indicative of a plurality of sets of parameters for a RLM operation pertaining to wireless communication between the UE and the network entity, each of the plurality of sets of parameters being associated with a different energy saving mode of the plurality of energy saving modes; and performing the RLM operation using one or more parameters of a first set of parameters associated with the first energy saving mode.

Aspect 2: The method of aspect 1, wherein receiving the information indicative of the plurality of sets of parameters further comprises: receiving, with each of the plurality of sets of parameters, an indication of a maximum beam failure instance count, each of the maximum beam failure instance counts being specific to a respective energy saving mode of the plurality of energy saving modes, the maximum beam failure instance count representing a value with which the UE compares a beam failure instance counter value as part of the RLM operation.

Aspect 3: The method of any of aspects 1 through 2, further comprising: receiving a second message indicating that the network entity is to switch from the first energy saving mode to a second energy saving mode associated with operation of the network entity, wherein the second energy saving mode is one of the plurality of energy saving modes; and setting a maximum beam failure instance count value for the RLM operation based at least in part on a second set of parameters associated with the second energy saving mode, the second set of parameters being of the plurality of sets of parameters.

Aspect 4: The method of aspect 3, further comprising: initiating a beam failure instance counter at the UE as part of the RLM operation and while the network entity is operating in the first energy saving mode; incrementing the beam failure instance counter as part of the RLM operation; and re-initiating the beam failure instance counter based at least in part on the network entity switching to operation in the second energy saving mode.

Aspect 5: The method of any of aspects 3 through 4, further comprising: initiating a beam failure instance counter at the UE as part of the RLM operation and while the network entity is operating in the first energy saving mode; incrementing the beam failure instance counter as part of the RLM operation; and modifying a count of the beam failure instance counter by a value based at least in part on the network entity switching from operation in the first energy saving mode to operation in the second energy saving mode.

Aspect 6: The method of any of aspects 3 through 5, further comprising: initiating a beam failure instance counter at the UE as part of the RLM operation and while the network entity is operating in the first energy saving mode; incrementing the beam failure instance counter as part of the RLM operation; and determining whether to declare beam failure based at least in part on a comparison of a value of the beam failure instance counter with the maximum beam failure instance count value associated with the second energy saving mode, the comparison occurring at or after the network entity switching from operation in the first energy saving mode to operation in the second energy saving mode.

Aspect 7: The method of any of aspects 3 through 6, further comprising: initiating a first beam failure detection timer at the UE as part of the RLM operation and while the network entity is operating in the first energy saving mode, the first beam failure detection timer having a first maximum value pertaining to a timing for determining beam failure, the first maximum value of the first beam failure detection timer identified in the first set of parameters; running the first beam failure detection timer as part of the RLM operation, wherein at a time of the network entity switching from operation in the first energy saving mode to operation in the second energy saving mode, the first beam failure detection timer is still running; and determining whether to adjust the timing for determining beam failure based at least in part on the network entity switching from operation in the first energy saving mode to operation in the second energy saving mode.

Aspect 8: The method of aspect 7, wherein determining whether to adjust the timing further comprises: resetting the timing by initiating a second beam failure detection timer at the UE as part of the RLM operation and based at least in part on the network entity switching from operation in the first energy saving mode to operation in the second energy saving mode, the second beam failure detection timer having a second maximum value pertaining to the timing for determining beam failure, the second maximum value of the second beam failure detection timer identified in the second set of parameters.

Aspect 9: The method of any of aspects 7 through 8, wherein determining whether to adjust the timing further comprises: initiating a second beam failure detection timer at the UE as if the second beam failure detection timer was started at a same time as the first beam failure detection timer, the second beam failure detection timer having a second maximum value pertaining to the timing for determining beam failure, the second maximum value of the second beam failure detection timer identified in the second set of parameters.

Aspect 10: The method of any of aspects 7 through 9, wherein determining whether to adjust the timing further comprises: maintaining the timing by allowing the first beam failure detection timer to continue until the first beam failure detection timer either resets or expires.

Aspect 11: The method of any of aspects 7 through 10, wherein determining whether to adjust the timing further comprises: applying an offset to the first maximum value of the first beam failure detection timer so that the timing is equal to a second maximum value identified in the second set of parameters associated with the second energy saving mode of the network entity.

Aspect 12: The method of any of aspects 1 through 11, wherein receiving the information indicative of the plurality of sets of parameters further comprises: receiving, with each of the plurality of sets of parameters, an indication of an in-sync threshold and an out-of-sync threshold, each of the in-sync thresholds and the out-of-sync thresholds being specific to a respective energy saving mode of the plurality of energy saving modes, the in-sync thresholds and the out-of-sync thresholds being used to evaluate a downlink reliability of a channel for wireless communications between the UE and the network entity.

Aspect 13: The method of any of aspects 1 through 12, further comprising: receiving a second message indicating that the network entity is to switch from the first energy saving mode to a second energy saving mode associated with operation of the network entity, wherein the second energy saving mode is one of the plurality of energy saving modes; and setting an in-sync threshold and an out-of-sync threshold for determining channel reliability of the wireless communication between the UE and the network entity based at least in part on a second set of parameters associated with the second energy saving mode, the second set of parameters being of the plurality of sets of parameters.

Aspect 14: The method of aspect 13, further comprising: re-evaluating previous in-sync or out-of-sync determinations based at least in part on the in-sync threshold or the out-of-sync threshold from the second set of parameters.

Aspect 15: The method of any of aspects 13 through 14, wherein setting the in-sync threshold and the out-of-sync threshold further comprises: applying an offset to a previous in-sync threshold and a previous out-of-sync threshold associated with the first energy saving mode.

Aspect 16: An apparatus for wireless communication at a UE, comprising a processor; memory coupled with the processor; and instructions stored in the memory and executable by the processor to cause the apparatus to perform a method of any of aspects 1 through 15.

Aspect 17: An apparatus for wireless communication at a UE, comprising at least one means for performing a method of any of aspects 1 through 15.

Aspect 18: A non-transitory computer-readable medium storing code for wireless communication at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a first message indicating that a network entity in wireless communication with the UE is operating in a first energy saving mode, wherein the first energy saving mode is one of a plurality of energy saving modes;

receiving information indicative of a plurality of sets of parameters for a radio link monitoring operation pertaining to wireless communication between the UE and the network entity, each of the plurality of sets of parameters being associated with a different energy saving mode of the plurality of energy saving modes;

performing the radio link monitoring operation using one or more parameters of a first set of parameters associated with the first energy saving mode;

receiving a second message indicating that the network entity is to switch from the first energy saving mode to a second energy saving mode associated with operation of the network entity, wherein the second energy saving mode is one of the plurality of energy saving modes; and setting a maximum beam failure instance count value for the radio link monitoring operation based at least in part on a second set of parameters associated with the second energy saving mode, the second set of parameters being of the plurality of sets of parameters.

2. The method of claim 1, wherein receiving the information indicative of the plurality of sets of parameters further comprises:

receiving, with each of the plurality of sets of parameters, an indication of a maximum beam failure instance count, each of the maximum beam failure instance counts being specific to a respective energy saving mode of the plurality of energy saving modes, the maximum beam failure instance count representing a value with which the UE compares a beam failure instance counter value as part of the radio link monitoring operation.

3. The method of claim 1, further comprising:

initiating a beam failure instance counter at the UE as part of the radio link monitoring operation and while the network entity is operating in the first energy saving mode;

incrementing the beam failure instance counter as part of the radio link monitoring operation; and re-initiating the beam failure instance counter based at least in part on the network entity switching to operation in the second energy saving mode.

4. The method of claim 1, further comprising:

initiating a beam failure instance counter at the UE as part of the radio link monitoring operation and while the network entity is operating in the first energy saving mode;

incrementing the beam failure instance counter as part of the radio link monitoring operation; and modifying a count of the beam failure instance counter by a value based at least in part on the network entity switching from operation in the first energy saving mode to operation in the second energy saving mode.

5. The method of claim 1, further comprising:

initiating a beam failure instance counter at the UE as part of the radio link monitoring operation and while the network entity is operating in the first energy saving mode;

incrementing the beam failure instance counter as part of the radio link monitoring operation; and determining whether to declare beam failure based at least in part on a comparison of a value of the beam failure instance counter with the maximum beam failure instance count value associated with the second energy saving mode, the comparison occurring at or after the network entity switching from operation in the first energy saving mode to operation in the second energy saving mode.

6. The method of claim 1, further comprising:

initiating a first beam failure detection timer at the UE as part of the radio link monitoring operation and while the network entity is operating in the first energy saving mode, the first beam failure detection timer having a first maximum value pertaining to a timing for determining beam failure, the first maximum value of the first beam failure detection timer identified in the first set of parameters;

running the first beam failure detection timer as part of the radio link monitoring operation, wherein at a time of the network entity switching from operation in the first energy saving mode to operation in the second energy saving mode, the first beam failure detection timer is still running; and determining whether to adjust the timing for determining beam failure based at least in part on the network entity switching from operation in the first energy saving mode to operation in the second energy saving mode.

7. The method of claim 6, wherein determining whether to adjust the timing further comprises:

resetting the timing by initiating a second beam failure detection timer at the UE as part of the radio link monitoring operation and based at least in part on the network entity switching from operation in the first energy saving mode to operation in the second energy saving mode, the second beam failure detection timer having a second maximum value pertaining to the timing for determining beam failure, the second maximum value of the second beam failure detection timer identified in the second set of parameters.

8. The method of claim 6, wherein determining whether to adjust the timing further comprises:

initiating a second beam failure detection timer at the UE as if the second beam failure detection timer was started at a same time as the first beam failure detection timer, the second beam failure detection timer having a second maximum value pertaining to the timing for determining beam failure, the second maximum value of the second beam failure detection timer identified in the second set of parameters.

9. The method of claim 6, wherein determining whether to adjust the timing further comprises:

maintaining the timing by allowing the first beam failure detection timer to continue until the first beam failure detection timer either resets or expires.

10. The method of claim 6, wherein determining whether to adjust the timing further comprises:

applying an offset to the first maximum value of the first beam failure detection timer so that the timing is equal to a second maximum value identified in the second set of parameters associated with the second energy saving mode of the network entity.

11. The method of claim 1, wherein receiving the information indicative of the plurality of sets of parameters further comprises:

receiving, with each of the plurality of sets of parameters, an indication of an in-sync threshold and an out-of-sync threshold, each of the in-sync thresholds and the out-of-sync thresholds being specific to a respective energy saving mode of the plurality of energy saving modes, the in-sync thresholds and the out-of-sync thresholds being used to evaluate a downlink reliability of a channel for wireless communications between the UE and the network entity.

12. The method of claim 1, further comprising:
receiving a second message indicating that the network entity is to switch from the first energy saving mode to a second energy saving mode associated with operation of the network entity, wherein the second energy saving mode is one of the plurality of energy saving modes; and
setting an in-sync threshold and an out-of-sync threshold for determining channel reliability of the wireless communication between the UE and the network entity based at least in part on a second set of parameters associated with the second energy saving mode, the second set of parameters being of the plurality of sets of parameters.

13. The method of claim 12, further comprising:
re-evaluating previous in-sync or out-of-sync determinations based at least in part on the in-sync threshold or the out-of-sync threshold from the second set of parameters.

14. The method of claim 12, wherein setting the in-sync threshold and the out-of-sync threshold further comprises:
applying an offset to a previous in-sync threshold and a previous out-of-sync threshold associated with the first energy saving mode.

15. An apparatus for wireless communication at a user equipment (UE), comprising:
a processor;
memory coupled with the processor; and
instructions stored in the memory and executable by the processor to cause the apparatus to:
receive a first message indicating that a network entity in wireless communication with the UE is operating in a first energy saving mode, wherein the first energy saving mode is one of a plurality of energy saving modes;
receive information indicative of a plurality of sets of parameters for a radio link monitoring operation pertaining to wireless communication between the UE and the network entity, each of the plurality of sets of parameters being associated with a different energy saving mode of the plurality of energy saving modes;
perform the radio link monitoring operation using one or more parameters of a first set of parameters associated with the first energy saving mode;
receive a second message indicating that the network entity is to switch from the first energy saving mode to a second energy saving mode associated with operation of the network entity, wherein the second energy saving mode is one of the plurality of energy saving modes; and
set a maximum beam failure instance count value for the radio link monitoring operation based at least in part on a second set of parameters associated with the second energy saving mode, the second set of parameters being of the plurality of sets of parameters.

16. The apparatus of claim 15, wherein the instructions to receive the information indicative of the plurality of sets of parameters are further executable by the processor to cause the apparatus to:
receive, with each of the plurality of sets of parameters, an indication of a maximum beam failure instance count, each of the maximum beam failure instance counts being specific to a respective energy saving mode of the plurality of energy saving modes, the maximum beam failure instance count representing a value with which the UE compares a beam failure instance counter value as part of the radio link monitoring operation.

17. The apparatus of claim 15, wherein the instructions are further executable by the processor to cause the apparatus to:
initiate a beam failure instance counter at the UE as part of the radio link monitoring operation and while the network entity is operating in the first energy saving mode;
increment the beam failure instance counter as part of the radio link monitoring operation; and
re-initiate the beam failure instance counter based at least in part on the network entity switching to operation in the second energy saving mode.

18. The apparatus of claim 15, wherein the instructions are further executable by the processor to cause the apparatus to:
initiate a beam failure instance counter at the UE as part of the radio link monitoring operation and while the network entity is operating in the first energy saving mode;
increment the beam failure instance counter as part of the radio link monitoring operation; and
modify a count of the beam failure instance counter by a value based at least in part on the network entity switching from operation in the first energy saving mode to operation in the second energy saving mode.

19. The apparatus of claim 15, wherein the instructions are further executable by the processor to cause the apparatus to:
initiate a beam failure instance counter at the UE as part of the radio link monitoring operation and while the network entity is operating in the first energy saving mode;
increment the beam failure instance counter as part of the radio link monitoring operation; and
determine whether to declare beam failure based at least in part on a comparison of a value of the beam failure instance counter with the maximum beam failure instance count value associated with the second energy saving mode, the comparison occurring at or after the network entity switching from operation in the first energy saving mode to operation in the second energy saving mode.

20. The apparatus of claim 15, wherein the instructions are further executable by the processor to cause the apparatus to:
initiate a first beam failure detection timer at the UE as part of the radio link monitoring operation and while the network entity is operating in the first energy saving mode, the first beam failure detection timer having a first maximum value pertaining to a timing for determining beam failure, the first maximum value of the first beam failure detection timer identified in the first set of parameters;
run the first beam failure detection timer as part of the radio link monitoring operation, wherein at a time of the network entity switching from operation in the first energy saving mode to operation in the second energy saving mode, the first beam failure detection timer is still running; and
determine whether to adjust the timing for determining beam failure based at least in part on the network entity switching from operation in the first energy saving mode to operation in the second energy saving mode.

21. The apparatus of claim 20, wherein the instructions to determine whether to adjust the timing are further executable by the processor to cause the apparatus to:

reset the timing by initiating a second beam failure detection timer at the UE as part of the radio link monitoring operation and based at least in part on the network entity switching from operation in the first energy saving mode to operation in the second energy saving mode, the second beam failure detection timer having a second maximum value pertaining to the timing for determining beam failure, the second maximum value of the second beam failure detection timer indicated in the second set of parameters.

22. The apparatus of claim 20, wherein the instructions to determine whether to adjust the timing are further executable by the processor to cause the apparatus to:

initiate a second beam failure detection timer at the UE as if the second beam failure detection timer was started at a same time as the first beam failure detection timer, the second beam failure detection timer having a second maximum value pertaining to the timing for determining beam failure, the second maximum value of the second beam failure detection timer identified in the second set of parameters.

23. The apparatus of claim 20, wherein the instructions to determine whether to adjust the timing are further executable by the processor to cause the apparatus to:

maintain the timing by allowing the first beam failure detection timer to continue until the first beam failure detection timer either resets or expires.

24. The apparatus of claim 20, wherein the instructions to determine whether to adjust the timing are further executable by the processor to cause the apparatus to:

apply an offset to the first maximum value of the first beam failure detection timer so that the timing is equal to a second maximum value identified in the second set of parameters associated with the second energy saving mode of the network entity.

25. The apparatus of claim 15, wherein the instructions to receive the information indicative of the plurality of sets of parameters are further executable by the processor to cause the apparatus to:

receive, with each of the plurality of sets of parameters, an indication of an in-sync threshold and an out-of-sync threshold, each of the in-sync thresholds and the out-of-sync thresholds being specific to a respective energy saving mode of the plurality of energy saving modes, the in-sync thresholds and the out-of-sync thresholds being used to evaluate a downlink reliability of a channel for wireless communications between the UE and the network entity.

26. The apparatus of claim 15, wherein the instructions are further executable by the processor to cause the apparatus to:

receive a second message indicating that the network entity is to switch from the first energy saving mode to a second energy saving mode associated with operation of the network entity, wherein the second energy saving mode is one of the plurality of energy saving modes; and set an in-sync threshold and an out-of-sync threshold for determining channel reliability of the wireless communication between the UE and the network entity based at least in part on a second set of parameters associated with the second energy saving mode, the second set of parameters being of the plurality of sets of parameters.

27. An apparatus for wireless communication at a user equipment (UE), comprising:

means for receiving a first message indicating that a network entity in wireless communication with the UE is operating in a first energy saving mode, wherein the first energy saving mode is one of a plurality of energy saving modes;

means for receiving information indicative of a plurality of sets of parameters for a radio link monitoring operation pertaining to wireless communication between the UE and the network entity, each of the plurality of sets of parameters being associated with a different energy saving mode of the plurality of energy saving modes;

means for performing the radio link monitoring operation using one or more parameters of a first set of parameters associated with the first energy saving mode;

means for receiving a second message indicating that the network entity is to switch from the first energy saving mode to a second energy saving mode associated with operation of the network entity, wherein the second energy saving mode is one of the plurality of energy saving modes; and means for setting a maximum beam failure instance count value for the radio link monitoring operation based at least in part on a second set of parameters associated with the second energy saving mode, the second set of parameters being of the plurality of sets of parameters.

28. A non-transitory computer-readable medium storing code for wireless communication at a user equipment (UE), the code comprising instructions executable by a processor to:

receive a first message indicating that a network entity in wireless communication with the UE is operating in a first energy saving mode, wherein the first energy saving mode is one of a plurality of energy saving modes;

receive information indicative of a plurality of sets of parameters for a radio link monitoring operation pertaining to wireless communication between the UE and the network entity, each of the plurality of sets of parameters being associated with a different energy saving mode of the plurality of energy saving modes;

perform the radio link monitoring operation using one or more parameters of a first set of parameters associated with the first energy saving mode;

receive a second message indicating that the network entity is to switch from the first energy saving mode to a second energy saving mode associated with operation of the network entity, wherein the second energy saving mode is one of the plurality of energy saving modes; and set a maximum beam failure instance count value for the radio link monitoring operation based at least in part on a second set of parameters associated with the second energy saving mode, the second set of parameters being of the plurality of sets of parameters.

* * * * *